United States Patent [19]

Namekata et al.

[11] Patent Number: 5,648,991

[45] Date of Patent: Jul. 15, 1997

[54] SAMPLING PHASE SYNCHRONIZING APPARATUS AND BIDIRECTIONAL MAXIMUM LIKELIHOOD SEQUENCE ESTIMATION SCHEME THEREFORE

[75] Inventors: Minoru Namekata; Junzo Murakami, both of Kawasaki, Japan

[73] Assignee: Kabushiki Kaisha Toshiba, Kawasaki, Japan

[21] Appl. No.: 389,581

[22] Filed: Feb. 16, 1995

[30] Foreign Application Priority Data

Feb. 16, 1994 [JP] Japan .................................. 6-018778
Jun. 23, 1994 [JP] Japan .................................. 6-140616

[51] Int. Cl.$^6$ ............................................ H04L 27/06
[52] U.S. Cl. ........................................ 375/341; 375/231
[58] Field of Search .............................. 375/231, 232,
375/262, 341, 326, 355, 227; 371/43; 370/93

[56] References Cited

U.S. PATENT DOCUMENTS

| 5,182,749 | 1/1993 | Kazecki et al. | 370/100.1 |
| 5,263,026 | 11/1993 | Parr et al. | 375/232 |
| 5,274,670 | 12/1993 | Serizawa et al. | 375/232 |

OTHER PUBLICATIONS

IEEE, Globecom, pp. 1458–1462, Yow–Jong Liu, "Bi-Directional Equalization Technique for TDMA Communication Systems Over Land Mobile Radio Channels".

IEEE, VTC, vol. 2, pp. 744–747, 1992, R. D. Koilpillai, et al., "Low Complexity Equalizers for U.S. Digital Cellular System".

Primary Examiner—Tesfaldet Bocure
Attorney, Agent, or Firm—Oblon, Spivak, McClelland, Maier & Neustadt, P.C.

[57] ABSTRACT

A sampling phase synchronizing apparatus includes a received signal memory for storing a received signal partially including training codes, a channel response calculator for calculating the time response of a channel (to be referred to as a channel response hereinafter) unique to the reception time using a partial sequence of the training codes included in the received signal stored in the received signal memory, a power ratio calculator for calculating the ratio between the power of the channel response calculated by the channel response calculator, and the power of a portion of the channel response, a power ratio memory for storing the power ratio calculated by the power ratio calculator, and a sampling phase deciding section for determining a sampling phase using the power ratio stored in the power ratio memory. The apparatus samples the received signal with reference to the sampling phase determined by the sampling phase deciding section.

9 Claims, 22 Drawing Sheets

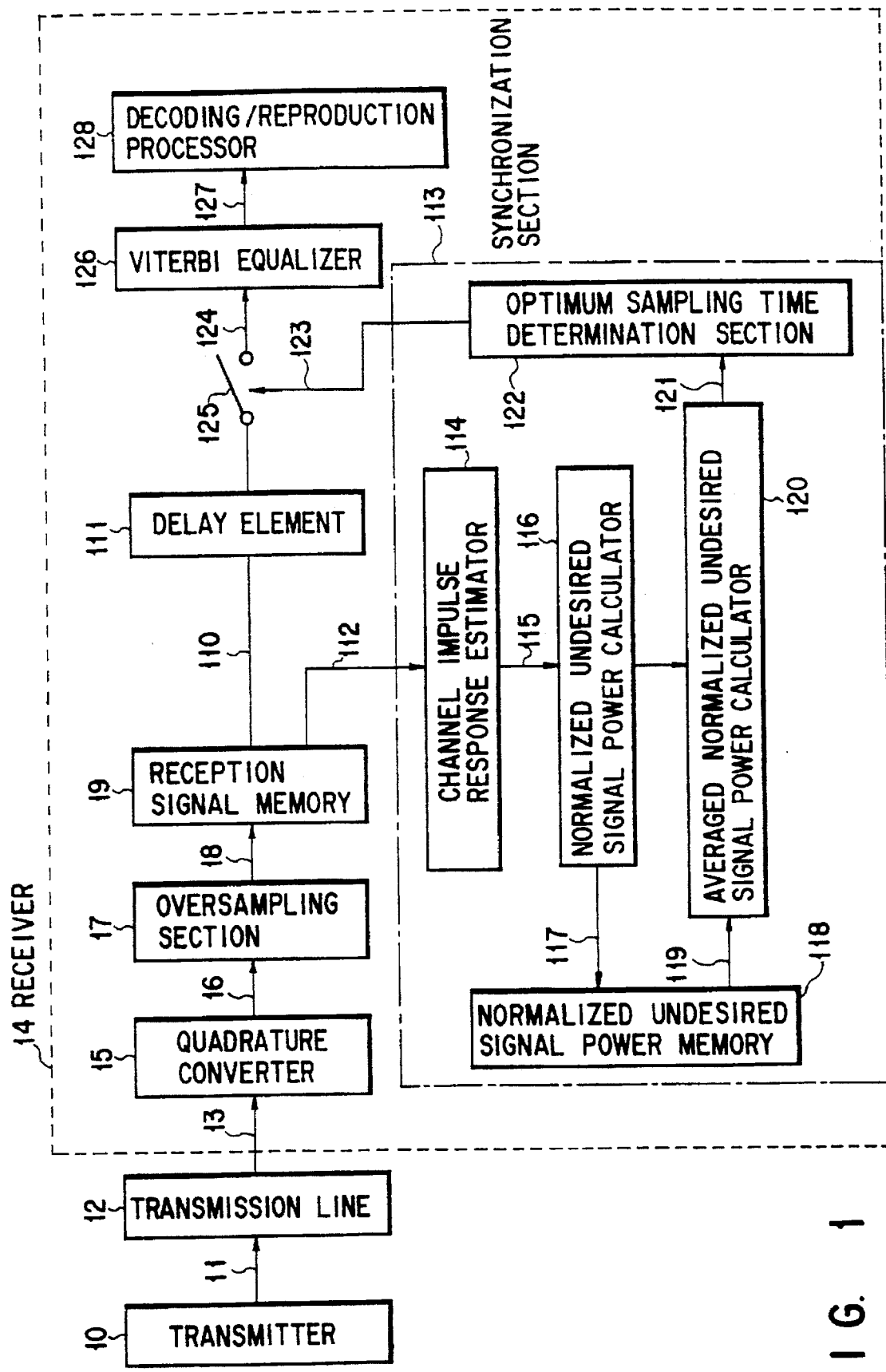
F I G. 1

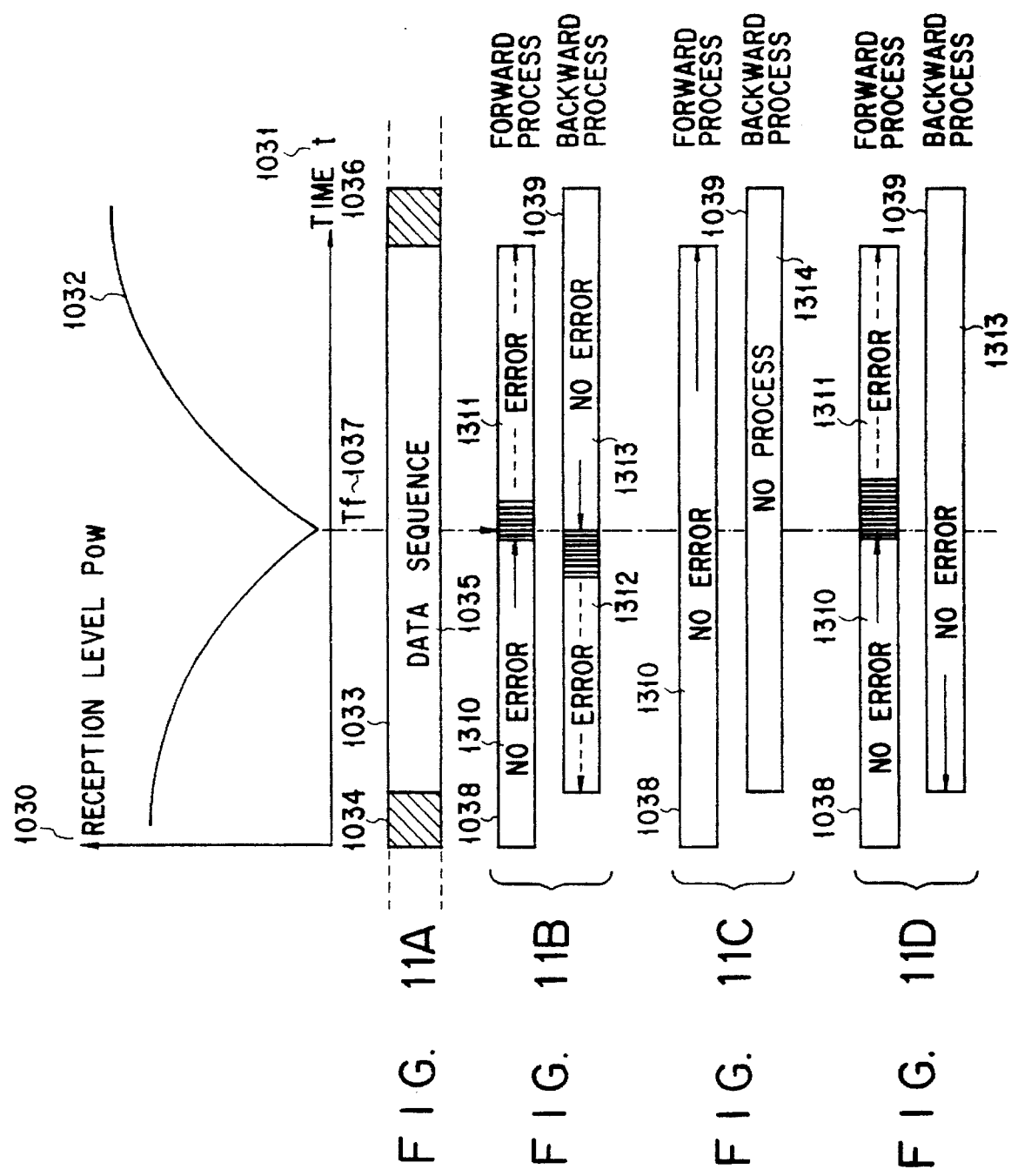

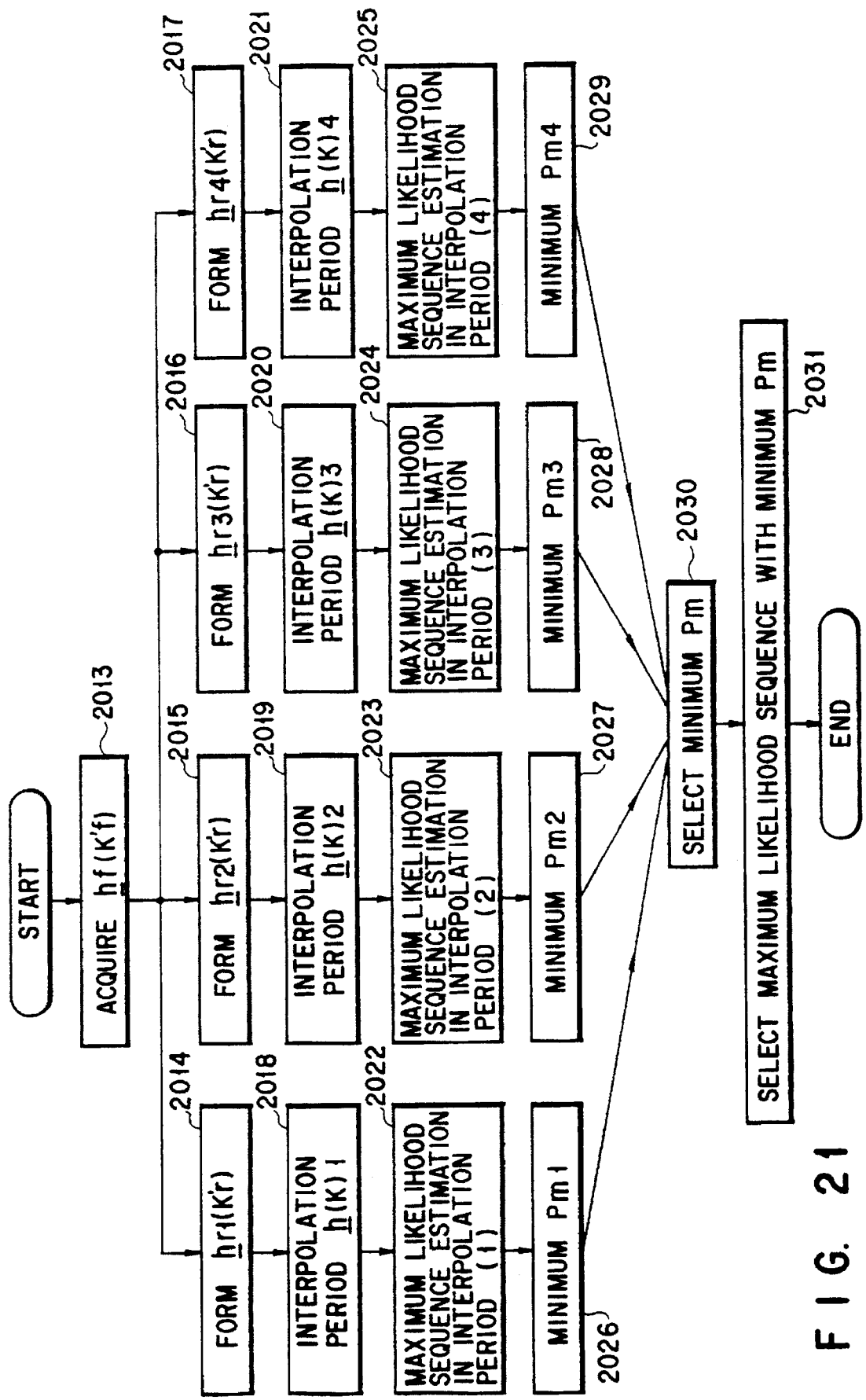
F I G. 21

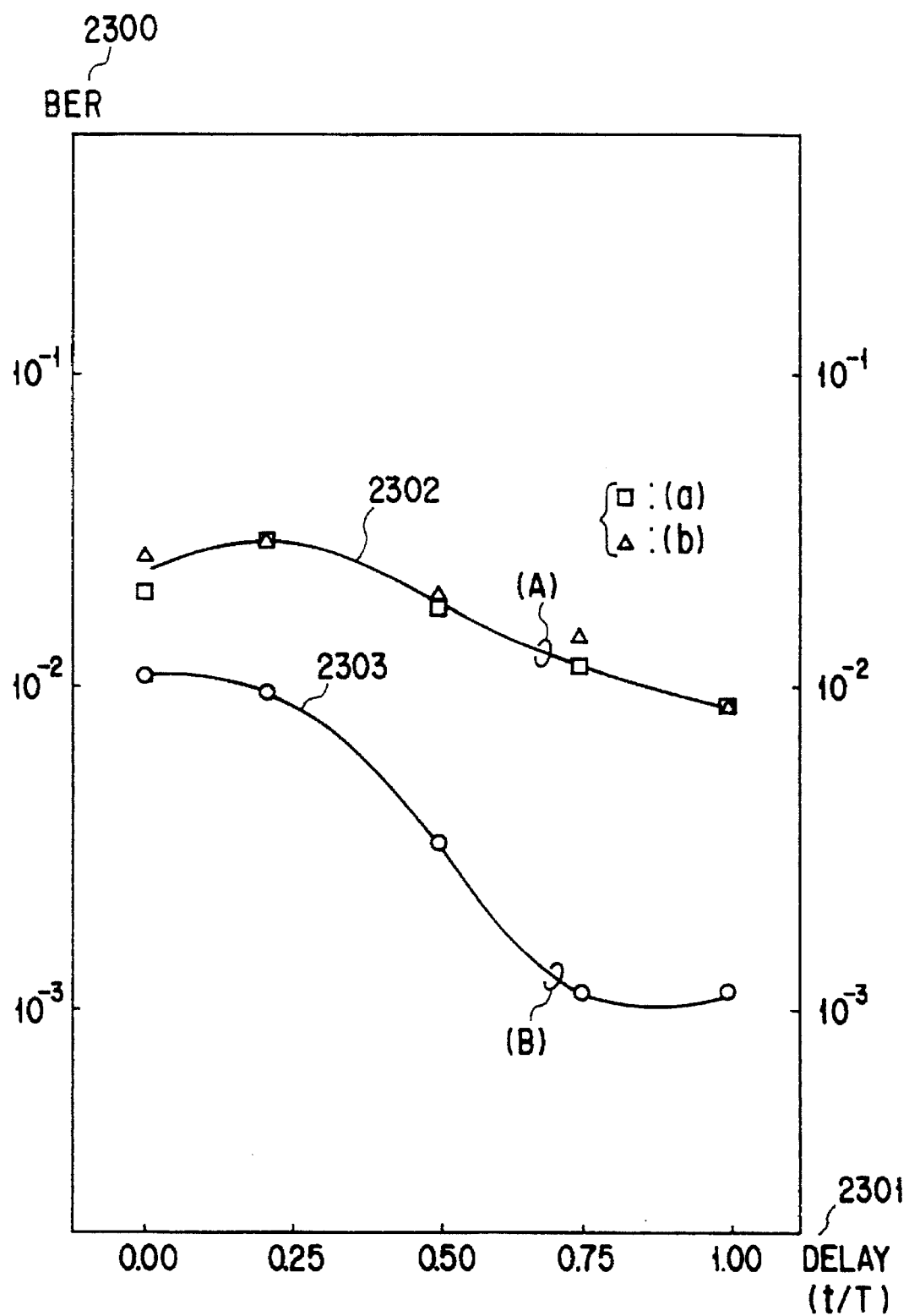
F I G. 26

स5,648,991

SAMPLING PHASE SYNCHRONIZING APPARATUS AND BIDIRECTIONAL MAXIMUM LIKELIHOOD SEQUENCE ESTIMATION SCHEME THEREFORE

BACKGROUND OF THE INVENTION

1. Field of the Invention

The present invention relates to a sampling phase synchronizing apparatus which performs sampling phase synchronization of a received signal waveform to be supplied to a Viterbi equalizer used as an equalizer for compensating for a distortion of a received signal from a transmission channel in a receiver of a digital communication system and, more particularly, to a sampling phase synchronizing apparatus which can reduce the bit error rate of the Viterbi equalizer, and a bidirectional maximum likelihood sequence estimation scheme used therefor.

2. Description of the Related Art

In recent years, digital mobile communication systems have been rapidly developed. Upon execution of land mobile communications, a received signal undergoes a complicated and considerable distortion due to multiplexed wave transmission interference with a transmission delay caused by physical environments around a mobile station, and high-speed movement of the mobile station. The mobile station must compensate for distortion components including noise from the received signal, on which noise is further superposed, using some signal processing scheme. Waveform equalizing techniques in the digital mobile communications are techniques for compensating for such distortions, and two major techniques are available. One technique corresponds to a decision feedback equalizer, and the other technique is a Viterbi equalizer (adaptive maximum likelihood sequence estimator). The former technique has been examined and put into practical applications in terms of easy realization upon evaluation based on the computational complexity, hardware scale, and the like. The latter technique is the best of the waveform equalizing techniques, and can be put into practical applications due to remarkable development of recent LSI micropatterning techniques and advent of a high speed digital signal processor (DSP) suitable for a digital signal process.

Upon reception of a received signal sequence, the Viterbi equalizer selects only one transmitted signal sequence, which agrees most with the received signal sequence, from all possible transmitted signal sequences to be transmitted. The Viterbi equalizer operates under the premise that the channel impulse response is known by some means. Therefore, a channel impulse response estimator is indispensable in the Viterbi equalizer. The channel impulse response intends to represent a transmission circumstance between the transmitter and receiver. More specifically, it intends to represent dispersion, along a time axis, of the information transmitted from a transmitter at a certain time in a circumstance in which a multipath transmission interference occurs. In other words, if a channel impulse response is estimated in the multipath transmission circumstance, the number of transmission channels and the transmission delay time between the transmitter and receiver can be estimated.

In general, a receiver is not phase-synchronized with a transmitter since the channel impulse response is unknown. A received signal waveform is oversampling-processed in the receiver, and thereafter, a phase synchronizing process is performed to decode information data. When a decision feedback equalizer is utilized in decoding of information data in the receiver, a decision feedback equalizer which has a fractionally spaced tap directly using an oversampling signal is effective, and is popularly used. The fractionally spaced decision feedback equalizer satisfies the sampling theorem since its tap interval is 1/N of a symbol transmission period T. Therefore, since the receiver becomes insensitive to the phase synchronization of a received signal, no special sampling phase synchronizing apparatus is necessary. In the fractionally spaced decision feedback equalizer, an adaptive algorithm process scheme need only operate, so that the output from a transversal filter in which an equalizing process is performed approximates a desired value, and the tap coefficient itself of the transversal filter adaptively corrects any sampling phase shift, equalizing time shift, and the like.

In the Viterbi equalizer, accurate simulation of the channel impulse response is most important to realize a low bit error rate. The tap interval of a transversal filter which simulates the channel impulse response in the Viterbi equalizer is normally set to be T, and the transversal filter can accurately simulate the channel response only when the amount of delay dispersion generated in a transmission channel is an integer multiple of T, thus realizing the best bit error rate performance. On the other hand, when the delay dispersion amount is not an integer multiple of T, a complicated intersymbol interference is generated in a received signal. In order to accurately describe the received signal, a transversal filter which has the number of taps corresponding to a length equal to the number of transmitted signal English letters constituting the received signal is required. The length is determined by the impulse response length of a band-pass filter which is normally effective for a baseband portion. When a fractionally spaced transversal filter which is obtained by setting the tap interval of the transversal filter for simulating the channel impulse response to be T/N is adopted, the receiver is expected to be insensitive to sample phase synchronization, but the tap length definitely increases N-fold. In any case, an increase in tap length directly leads to an increase in computational complexity and an increase in equivalent noise in the Viterbi equalizer, and the equalization performance consequently deteriorates.

As described above, when the Viterbi equalizer is used in the receiver, it is not practical to increase the tap length of the transversal filter which simulates the channel impulse response, and it is required to constitute the transversal filter by the number of taps corresponding to the minimum required interval T. For example, if the delay dispersion amount in a transmission channel is within T, the tap length is 2. However, when the tap interval is T, the Viterbi equalizer must be phase-synchronized with a received signal since it cannot satisfy the sampling theorem. Originally, unless the delay dispersion amount in a transmission channel is an integer multiple of the transmission symbol transmission period T, an optimum sampling phase synchronizing time cannot be determined, and a phase corresponding to a minimum bit error rate of the decoded result can only be an optimum sampling phase synchronizing condition. However, in general, the sampling phase for minimizing the bit error rate cannot be recognized in practice since the receiver cannot measure the bit error rate. Thus, as normal means for achieving phase synchronization with a signal obtained via a transmission channel suffering delay dispersion, some measure for synchronizing with the most strongly received arrival wave is taken. For example, by executing a correlation arithmetic operation between a training sequence (or unique word) included in a TDMA slot and a received signal, the appearance time of a peak value of a correlation value is determined to be an optimum sampling phase time. However, this scheme can merely set the start portion of a slit in an optimum sampling phase state, and cannot cope with a phase variation in the slit in a radio channel with rapidly varied characteristics.

On the other hand, another example adopts a scheme for making the receiver insensitive to sampling phase synchronization by arranging two transversal filters with a tap interval T parallel to each other, and shifting the phase of a signal sequence input to one filter from that of a signal sequence input to the other filter by T/2. However, with this scheme, a scheme for optimizing the synthesizing method of the outputs from the two parallel transversal filters is complex, and this arrangement is equivalent to a single fractionally spaced transversal filter in one view. As a result, substantially the same influence as deterioration caused by an increase in tap length appears, and this arrangement does not contribute to realization of a low bit error rate although the receiver is insensitive to sampling phase synchronization. Furthermore, since signals substantially suffering from an intersymbol interference must be processed in every transmission channel state, the convergence time of an adaptive algorithm is undesirably prolonged, and equivalent noise is generated due to the presence of extra codes, thus disturbing a stable operation.

As described above, when the delay dispersion amount of the transmission channel is not an integer multiple of the transmission symbol transmission period T, no optimum sampling phase time is present, and a sampling phase time at which the bit error rate can be minimized can only be set to be an optimum sampling phase time. In TDMA type communications in which transmission/reception is performed using slots each consisting of several symbols, the length of a training sequence is a signal sequence length less than 10% of the length of the entire slot, and a very long time period is required to obtain a bit error rate with certain reliability. Most of bit errors generated in a mobile transmission channel are not random errors determined by added noise, but are burst errors caused by multipath fading. For this reason, in some slots, the training sequence does not cause errors at all, but in some other slots, bit errors are destructively generated. In consideration of this fact, bit errors must be calculated using the training sequence in still more slots, resulting in a scheme far from a practical one. Furthermore, the bit error rate as an evaluation function can only determine errors in units of bits, but cannot be finely controlled in units of samples.

In the above-mentioned means for setting the appearance time of a peak value of a correlation value to be an optimum sampling phase time by executing the correlation arithmetic operation between a training sequence included in a TDMA slot and a received signal, when the transmission channel is, e.g., a 2-ray model with a delay dispersion amount T, the peak value of the correlation value appears at time t0 and time t0+T when viewed from the reference time of a transmitter. However, the receiver side cannot distinguish time t0 and time t0+T from each other since it cannot detect the reference time of the transmitter, and the appearance time of the peak value of the correlation value can only be set to be a sampling start time. In the case of the decision feedback equalizer, if a transversal filter relatively longer than the delay dispersion amount of a transmission channel is prepared, no problem is caused by even a sampling phase determined by this scheme. The reason for this has already been described above. However, in the case of the Viterbi equalizer, the transmission channel response must be accurately simulated. In other words, the receiver must be synchronized with the reference time of the transmitter. Thus, a case will be examined below wherein the above-mentioned sampling phase synchronizing apparatus which cannot distinguish time t0 and time t0+T is used in the Viterbi equalizer. If the receiver is synchronized with time t0, the channel impulse response is evaluated using the first tap as a reference tap corresponding to time t0. In this case, since the second tap corresponds to time t0+T, the channel impulse response can be normally evaluated, and the Viterbi equalizer performs a normal operation. On the contrary, if the receiver is synchronized with time t0+T, since the channel impulse response is evaluated using the first tap as a reference tap corresponding to time t0+T, the second tap becomes insignificant, and no tap corresponding to time t0 exists. Therefore, when the transmission channel circumstance varies, and the most strongly received signal shifts from a received signal through the delayed path (received at time t0+T) to a received signal through the direct path (received at time t0) (this shift is called a shift from a non-minimum phase mode to a minimum phase mode), the first tap gradually decreases. When the reception of the delay received signal is stopped, the evaluated channel impulse response has no information. If this phenomenon occurs, since the evaluated channel impulse response has a nature equivalent to random noise, the evaluated received signal becomes random. Since the channel impulse response is adaptively and sequentially updated using this random signal, burst errors occur, resulting in deterioration of the bit error rate.

SUMMARY OF THE INVENTION

It is an object of the present invention to provide a sampling phase synchronizing apparatus for a Viterbi equalizer, which can realize a transversal filter for simulating a channel impulse response in a minimum scale and can improve the bit error rate characteristics by estimating the channel impulse response which is accurately synchronized with the reference time of a transmission within a short period of time in sampling phase synchronization which largely influences the operation performance of the Viterbi equalizer.

According to the present invention, there is provided a sampling phase synchronizing apparatus comprising: a received signal memory for storing a received signal which partially includes a training sequence; a channel response calculator for calculating a time response of a channel (to be referred to as a channel response hereinafter) unique to a reception time using a partial training sequence included in the received signal stored in the received signal memory; a power ratio calculator for calculating the ratio between a power of the transmission channel whose channel response is calculated by the channel response calculator, and a power of a portion of the channel response; a power ratio memory for storing the power ratio calculated by the power ratio calculator; and a sampling phase decision section for determining a sampling phase using the power ratio stored in the power memory. The apparatus samples a received signal with reference to the sampling phase determined by the sampling phase decision section.

According to the present invention, since the sampling phase synchronizing apparatus based on the calculation result of the channel impulse response itself obtained using a training sequence is used, synchronization with the channel impulse response can be achieved. As a result, since optimum sampling phase synchronization with the received signal is always realized in correspondence with the delay dispersion amount of the transmission channel, the bit error rate can be remarkably improved.

In a multipath transmission channel, since a received signal through a direct path and a received signal through a delayed path which arrives with a time delay normally have no correlation therebetween, the phase relationship between the direct and delay received signals is a random phase relationship. In practice, accurate sampling phase synchronization is uniquely determined by the phase difference between the direct and delay received signals. However, in a radio channel with rapidly varied characteristics such as a mobile transmission channel, the phase different at the beginning of a slot is normally largely different from that at the end of the slot. Therefore, even when a sampling phase is strictly determined at the beginning of a slot, it cannot be optimum for the entire slot. In consideration of this respect, the present invention provides an optimum sampling phase synchronizing apparatus which defines an evaluation function using an average value determined based on information pertaining to the previous phase relationship between the direct and delay received signals, so that an optimum sampling phase state can be set on an average independently of the state of the phase relationship between the direct and delay received signals.

If several or more slots are available as previous information used for averaging, a great improvement can be expected. The evaluation function will be briefly explained below.

A total transmission/reception impulse response (including a band-pass filter of a transmitter, a channel impulse response, a band-pass filter of a receiver, and the like) at time k is represented by $h_k(i)$. Note that i indicates the oversampling order when the time synchronized with a direct received signal at time k is expressed by $i=0$. Therefore, when the oversampling is N times, an ideal received signal $r_k(i)$ at time k can be expressed by:

$$r_k(i) = \sum_{n=-A}^{A} h_k(i+nN)X_{k-n}$$

In this situation, if a received signal estimation value can be estimated by an ideal 2-tap transversal filter in the receiver, an estimated received signal $\hat{r}_k(i)$ at time k is given by:

$$\hat{r}_k(i) = \sum_{n=0}^{1} h_k(i+nN)X_{k-n}$$

An error signal $e_k(i)$ between the ideal received signal $r_k(i)$ and the estimated received signal $\hat{r}_k(i)$ at this time is:

$$\begin{aligned} e_k(i) &= r_k(i) - \hat{r}_k(i) \\ &= \sum_{n=-A}^{-1} h_k(i+nN)X_{k-n} + \\ &\quad \sum_{n=2}^{A} h_k(i+nN)X_{k-n} \end{aligned}$$

If the channel impulse response can be accurately estimated, the above-mentioned $e_k(i)$ must be minimum. In other words, sampling time i which minimizes $e_k(i)$ or a channel impulse response which minimizes $e_k(i)$ can be estimated.

When a channel impulse response is estimated using a training sequence added in a slot, a transmission impulse response very close to a true value must be estimated although there is an estimation delay time generated by an estimation adaptive algorithm. More specifically, it is easy to calculate the above-mentioned $e_k(i)$.

Thus, power unsample averages of the ideal received signal $r_k(i)$ and the error signal $e_k(i)$ will be calculated. The power unsample averages of the ideal received signal $r_k(i)$ and the error signal $e_k(i)$ are respectively represented by $R_k(i)$ and $U_k(i)$.

$$\begin{aligned} R_k(i) &= E[r_k(i)r_k^*(i)] \\ &= E\left[\left\{\sum_{n=-A}^{A} h_k(i+nN)X_{k-n}\right\}\left\{\sum_{n=-A}^{A} h_k(i+nN)X_{k-n}\right\}^*\right] \\ &= \sum_{n=-A}^{A} h_k(i+nN)h_k^*(i+nN) \\ &= \sum_{n=-A}^{A} p_k(i+nN) \end{aligned}$$

$$\begin{aligned} U_k(i) &= E[e_k(i)e_k^*(i)] \\ &= \left[\left\{\sum_{n=-A}^{-1} h_k(i+nN)h_k^*(i+nN)\right\} + \right.\\ &\quad \left.\left\{\sum_{n=2}^{-A} h_k(i+nN)h_k^*(i+nN)\right\}\right] \\ &= R_k(i) - h_k(i)h_k^*(i) - h_k(i+N)h_k^*(i+N) \\ &= R_k(i) - p_k(i) - p_k(i+N) \end{aligned}$$

for $p_k(i+nN) = h_k(i+nN)h_k^*(i+nN)$ ($n=-A$ to $+A$).

The power unsample average of the error signal $e_k(i)$ is preferably as small as possible. As the evaluation function, a "normalized undesired signal power $\zeta_k(i)$" is defined as follows:

$$\zeta_k(i) = U_k(i)/R_k(i) \quad (0 \leq \zeta_k(i) \leq 1)$$

Consequently, as this evaluation function is smaller, the estimated channel impulse response becomes closer to a true value. As can be seen from this evaluation function, a parameter necessary for the evaluation function calculation is only an estimated channel impulse response. More specifically, after a channel impulse response is obtained by a transversal filter having a tap length (in the above-mentioned example, 2A+1) larger than that of a transversal filter for simulating a channel impulse response, which filter is required in the Viterbi equalizer, it suffices to calculate the ratio between the power of the actually required number of taps (in the above-mentioned example, two taps) and the entire power.

As described above, since this $\zeta_k(i)$ is determined by the instantaneous phase states of direct and delay received signals, stable sampling phase synchronizing characteristics are obtained by averaging $\zeta_k(i)$.

Ideal sampling times will be exemplified below. When the delay dispersion amount of a transmission channel is 0T, $i=-8$ or $i=0$; when the delay dispersion amount is 0.25T, $i=-3$; when the delay dispersion amount is 0.5T, $i=-2$; when the delay dispersion amount is 0.75T, $i=-1$; and when the delay dispersion amount is 1.0T, $i=0$. FIGS. 7A to 7E are graphs showing the average value of the above-mentioned $\zeta_k(i)$. The abscissa of each graph means i, and $i=0$ corresponds to the arrival time of the direct received signal and also coincides with the oversampling time which includes the start data of a training sequence added to a slot. Upon sampling of the evaluation function using an arbitrary threshold value, the number of times which cross the threshold value is counted, and the optimum sampling time is limited by the number of times. FIG. 8 shows a comparison among the bit error rate calculated when the threshold value is temporarily set to be 0.07, and the minimum value of the average $\zeta_k(i)$ is set to be an optimum sampling time when the number of crossing times is 3 or more or the middle-point time between two times is set to be an optimum sampling time when the number of crossing times is 2 or more; the bit error rate calculated when synchronization with the direct received signal is achieved like in the prior art; and the bit error rate according to the present invention. The curves shown in FIG. 8 will be explained below. Curves 73 and 74 as CIR (Channel Impulse Response) estimated represent the results estimated by a channel impulse response estimator as one component constituting the Viterbi equalizer using an adaptive algorithm (LMS algorithm), and curves 75 and 76 as CIR known represent the simulation results obtained when the ideal value of a channel impulse response is assumed to be obtained by some means. As can be seen from FIG. 8, the system of the present invention which actively uses sampling phase synchronization, i.e., the Optimized Sampling Phase system can realize a satisfactory bit error rate.

As described above, in addition to realization of synchronization with the channel impulse response itself and the transmitter itself, i.e., with the received signal, the bit error rate can be remarkably improved as compared to the prior art.

Furthermore, the present invention provides a bidirectional maximum likelihood sequence estimation scheme equivalent to the Viterbi equalizer used in the above-mentioned sampling phase synchronizing apparatus.

According to this bidirectional maximum likelihood sequence estimation scheme, when a maximum likelihood sequence estimation scheme which performs: a Viterbi algorithm process for estimating a transmitted signal sequence from a received signal on the basis of an estimated channel impulse response; an estimated received signal calculation process for calculating an estimated received signal at time k on the basis of a training signal sequence or the transmitted signal sequence estimated by the Viterbi algorithm process, and a channel impulse response estimated at time k–1; an error signal formation process for forming an error signal between the received signal at time k and the estimated received signal at time k; and a channel impulse response estimation process for estimating a channel impulse response at time k using an adaptive algorithm on the basis of the error signal, is applied to TDMA communications in which transmission/reception is performed in units of slots, the maximum likelihood sequence estimation scheme performs a mode which operates from the beginning of a slot assigned to a communication forward along the time base direction (forward process), and a mode which operates from the end of the slot backward along the time base direction (backward process), and selects the result in an operation direction corresponding to a satisfactory communication quality in units of slots or in units of symbols constituting the slot. When the communication quality does not deteriorate during the forward process, the backward process is not performed, and only when the communication quality deteriorates during the forward process, the backward process is performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram of a receiver having a Viterbi equalizer added with a sampling phase synchronizing apparatus for a Viterbi equalizer according to an embodiment of the present invention;

FIG. 11 is a view showing the process principle of the bidirectional maximum likelihood sequence estimation scheme according to the embodiment of the present invention;

FIG. 21 is a flow chart showing the sequence for determining an estimated train in the intra-interpolation period in the synchronizing process shown in FIGS. 19 and 20;

FIG. 26 is a graph showing the bit error rate characteristics obtained by evaluating the bidirectional maximum likelihood sequence estimation scheme in a multipath fading transmission channel environment.

DETAILED DESCRIPTION OF THE PREFERRED EMBODIMENTS

Figure 2:
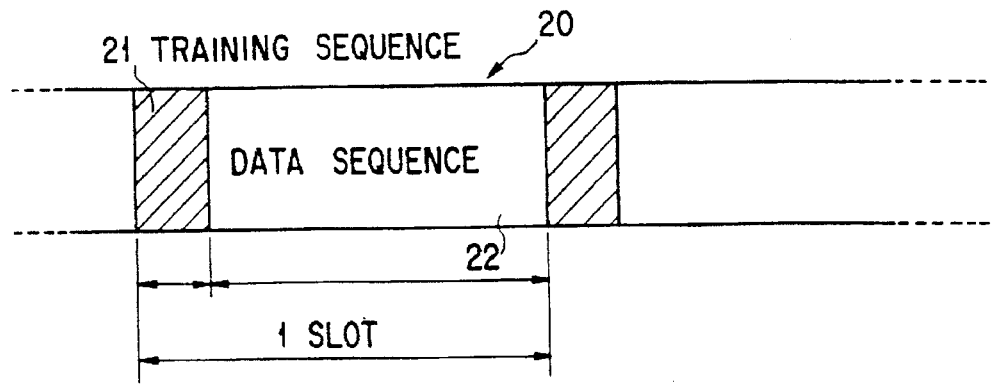
FIG. 2 is a view showing the TDMA slot format and the positions of a training sequence and an information sequence in the slot.

FIG. 1 shows the arrangement of a receiver which includes a sampling phase synchronizing apparatus for a Viterbi equalizer according to an embodiment of the present invention. A transmitter 10 shown in FIG. 1 generates a digitally modulated transmitted signal 11. A signal 13 obtained when the transmitted signal undergoes some distortions via a transmission channel 12 is input to a receiver 14 as a received signal. The received signal 13 is converted by a quadrature converter 15 into quadrature components consisting of in-phase components (I-channel components) and quadrature phase components (Q-channel components), thus obtaining a complex baseband signal 16. The complex baseband signal is converted into a discrete signal sequence 18 by an oversampling section (A/D converter) 17 on the basis of clocks having an oversampling period 1/N (N>1) a transmission symbol period T. The complex baseband signal 18 which is oversampled and converted into the discrete signal sequence is input to and stored in a memory 19 which stores only a portion corresponding to a training sequence portion 21 in a TDMA slot 20 shown in FIG. 2. The oversampled complex baseband signal 18 is input to a delay element 111, and is delayed by a time required for determining an optimum sampling phase. Thereafter, the complex baseband signal is input to a sampler 125 which operates at a T time interval.

Samples corresponding to K symbols (K>0) are read out in units of N samples from the memory 19 which stores the complex baseband received signal 18 corresponding to the training sequence portion 21 shown in the slot 20 in FIG. 2.

Note that signals to be read out are complex baseband signals corresponding to those in the training sequence portion 21. A readout complex baseband signal 112 is input to a channel impulse response estimator 114. The channel impulse response estimator 114 estimates a channel impulse response 115 using an ideal recepted signal sequence received in advance when the training sequence 21 is transmitted. A normalized undesired power calculator 116 calculates a normalized undesired signal power 117 defined as the ratio between the power of the estimated channel impulse response 115 and the power of an unnecessary tap therein. The calculated normalized undesired signal power 117 is input to and stored in a normalized undesired signal power memory 118 which comprises shift registers, memories, or the like.

The normalized undesired signal power memory 118 stores normalized undesired signal powers 117 for several previous slots, which were calculated at the same sampling time in the slot 20 which is periodically received and uniquely assigned to a receiver. When an averaged normalized undesired signal power calculator 120 calculates an averaged normalized undesired signal power 121, the oldest normalized undesired signal power value is discarded, and the latest normalized undesired signal power 117 is stored. The normalized undesired signal power 117 calculated at the current time and a plurality of normalized undesired signal power 119 which were calculated in slots received after a given previous time and are unique to the respective previous times are input to the averaged normalized undesired signal power calculator 120, and their average value 121 is calculated. In this apparatus, the processes from the read-out operation of the above-mentioned oversampled complex baseband received signal from the memory 19 to the calculation of the averaged normalized undesired signal power 121 are repeated a predetermined number of times (W times) while shifting signals in units of oversampled samples. The W averaged normalized undesired signal powers 121 which are unique to their readout times from the complex baseband received signal memory 19 are input to an optimum sampling time decision section 122, and an optimum sampling time is determined in accordance with an optimum sampling time decision algorithm. Then, sampling signals 123 at an N-sample interval are supplied to the sampler 125. A complex baseband signal 124 which is thin-out sampled, i.e., oversampled in units of N samples by the sampler 125 is input to a Viterbi equalizer 126. An output sequence 127 from the Viterbi equalizer 126 is reproduced in a format required for a decoding/reproduction processor 128 later, e.g., speech information, image information, or data information.

FIG. 2 shows an example of the slot format employed in the TDMA communication system. A set of the training sequence 21 and a data sequence (untraining sequence) constitute one slot 20. Such slots 20 are periodically transmitted, and a receiver receives only a slot assigned thereto and extracts transmission information in the slot. The sampling phase synchronizing scheme of the present invention achieves optimum sampling phase synchronization using the training sequence 21, whose contents are known in advance, in the slot 20.

Figure 3:
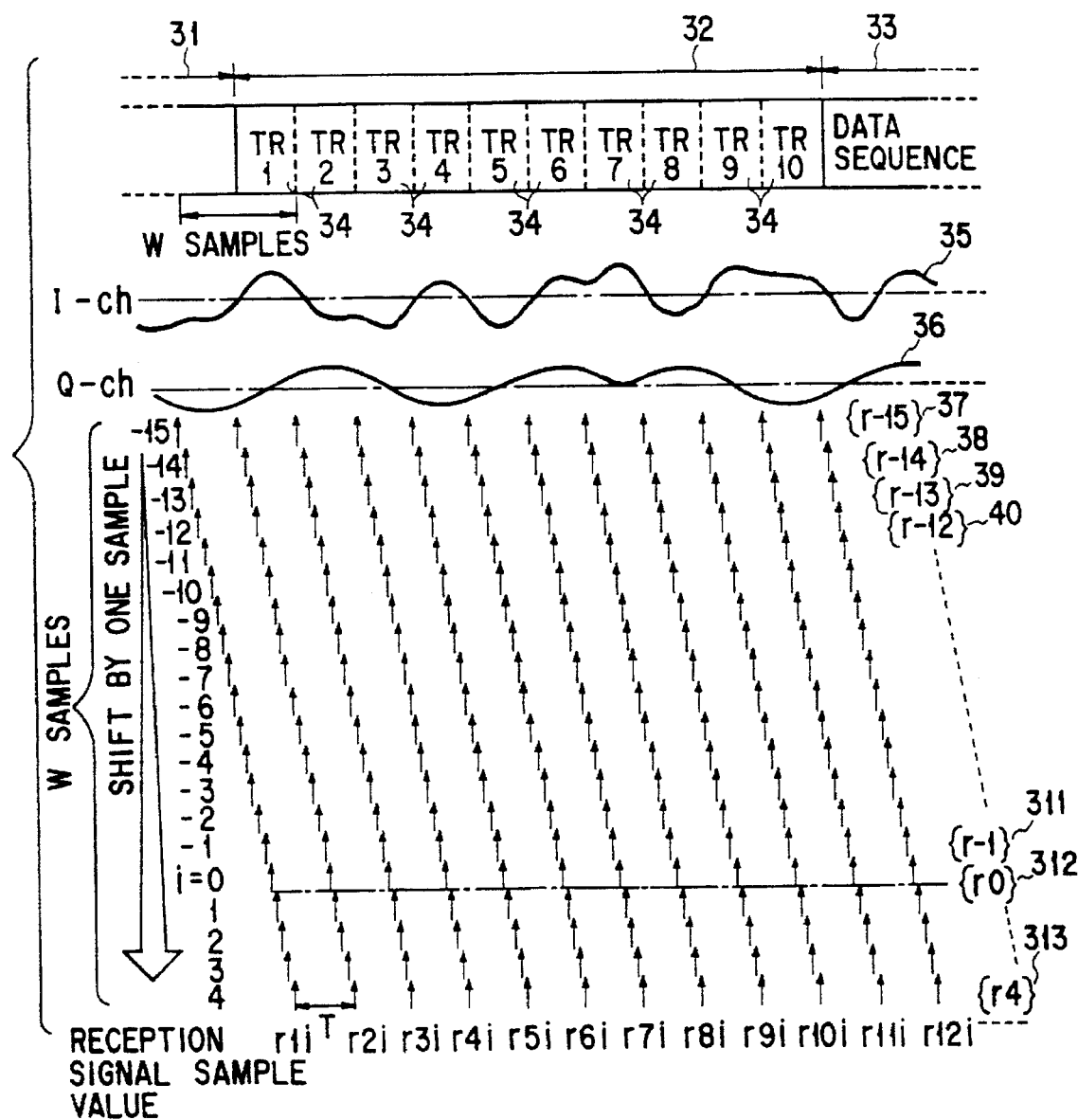
FIG. 3 is a schematic view upon oversampling of a complex baseband signal waveform corresponding to a training sequence portion in the TDMA slot.

FIG. 3 is a view which illustrates trains read out at N-sample intervals from the oversampled complex baseband received signal memory 19 shown in FIG. 1. Of a neighboring previous slot 31, a training sequence period 32 of a slot assigned to a receiver, and a data sequence period 33 assigned to the receiver, in-phase components 35 and quadrature components 36 of complex baseband received signals corresponding to symbol sequence 34 in the training sequence period 32 are read out (sampled) for K symbols at an N-sample interval while thinning out symbols. The readout complex baseband signal received signal sequences {ri} (in FIG. 3, −15 ≤ i ≤ 4) 37, 38, 39, 310, 311, 312, and 313 are respectively trains unique to the readout times (depending on i), and the channel impulse response estimator 114 (FIG. 1) calculates channel impulse responses unique to the readout times using these trains {ri} 37, 38, 39, 310, 311, 312, and 313.

Figure 4:
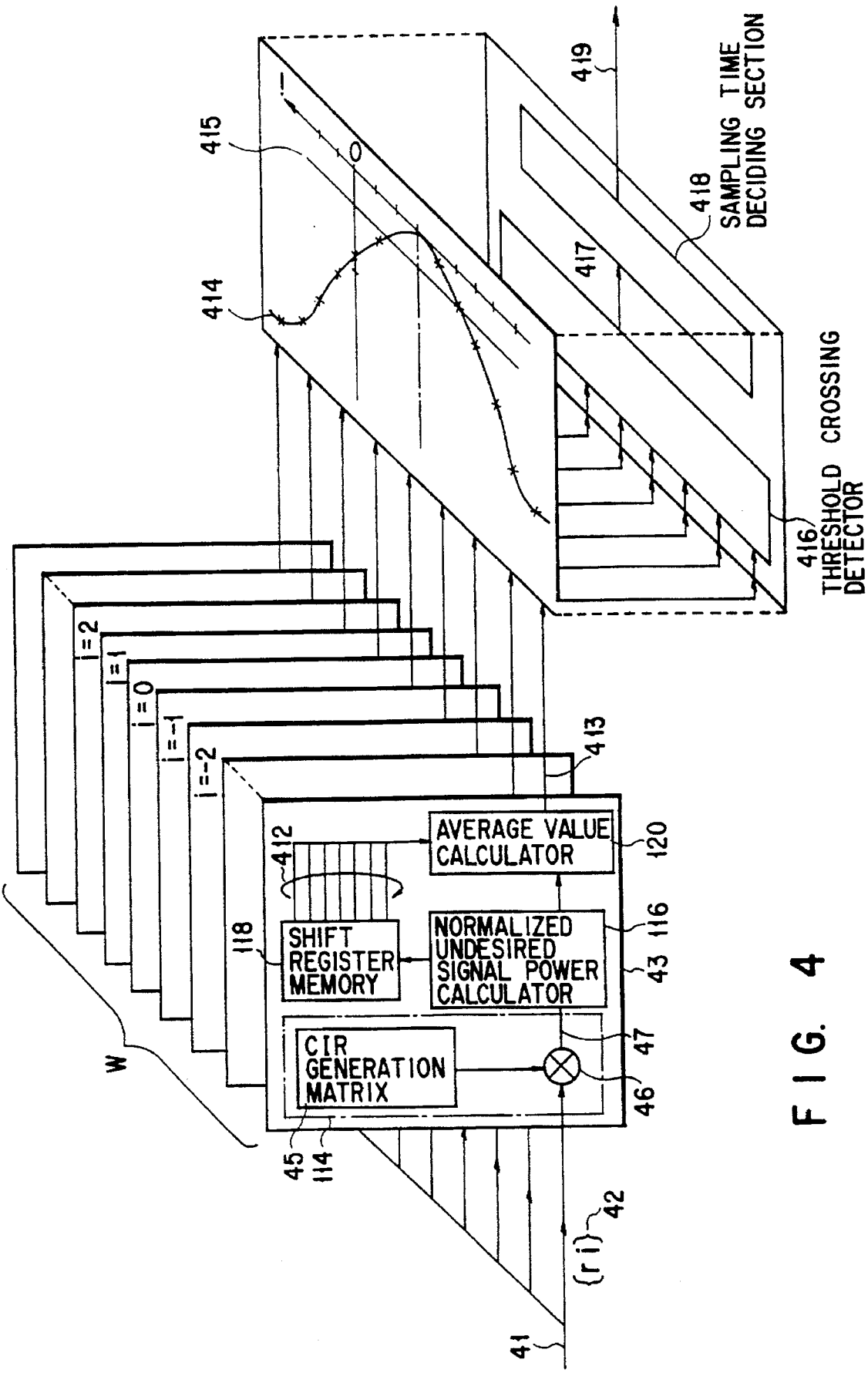
FIG. 4 is a block diagram which expresses an image of a sampling phase synchronizing scheme for a Viterbi equalizer according to the embodiment of the present invention.

FIG. 4 is an example of a block diagram which illustrates the processes until averaged normalized undesired signal powers unique to the readout times are calculated from complex baseband received signals which are shifted and read out at the N-sample interval in FIG. 3. Complex baseband received signal sequences 41 correspond to the complex baseband received signal sequences {ri} 37, 38, 39, 310, 311, 312, and 313, which are read out at the N-sample interval in FIG. 3. These complex baseband received signal sequences 41 are divided into trains {ri} 42, and are input to an averaged normalized undesired signal power value calculator 43. Each of the input sequence {ri} 42 is supplied to a channel impulse response estimator 44 and is multiplied with a CIR (Channel Impulse Response) generation matrix 45 by a complex matrix multiplier 46, thus obtaining a channel impulse response 47. The channel impulse response estimator 44 in FIG. 4 has such an arrangement since it is described based on an LS algorithm. However, this algorithm may be replaced by a sequential-updating type adaptive algorithm such as an RLS algorithm, LMS algorithm, or the like. Thus, the present invention is not limited to an implementation based on the LS algorithm as long as the channel impulse response 47 in the training sequence period 21 in the slot 20 shown in FIG. 2 is obtained. However, an implementation based on the LS algorithm is considered to be optimum since it can easily estimate the channel impulse response by an arithmetic process in a short period of time.

The channel impulse response 47 calculated by the channel impulse response estimator 44 is input to a normalized undesired signal power calculator 48 to calculate a normalized undesired signal power 49. The calculated normalized undesired signal power 49 is input to an averaged normalized undesired signal power calculator 410, and an averaged normalized undesired signal power 413 is calculated using the input normalized undesired signal power 49 and normalized undesired signal power values 412 which were calculated in the same sequence in the previously received slot. The normalized undesired signal power 49 is also input to a memory 411 comprising, e.g., shift registers. In this case, the oldest normalized undesired signal power is discarded, and the latest normalized undesired signal power 49 is stored in the memory 411.

FIG. 4 illustrates the averaged normalized undesired signal power calculators 43, which are unique to complex baseband received signals {ri}, parallel to each other since they have no difference in arrangement, but receive different sequences {ri}. Therefore, only one averaged normalized undesired signal power calculator 43 may be prepared, and may be time-divisionally utilized to calculate averaged normalized undesired signal power values unique to the sequences {ri} 42. Even in this case, the memories 411 must be independently prepared in correspondence with {ri}. The averaged normalized undesired signal power 413 output from each averaged normalized undesired signal power calculator 43 is a function of i. A threshold crossing detector 416 detects and counts the number of times of crossing between a characteristic curve 414 as a function of i and a threshold value 415. Threshold crossing time information 417 is input to a sampling time decision section 418, and optimum sampling time (iopt) 419 is determined based on the information 417. The determined time is supplied to the sampler 125 shown in FIG. 1. The sampling time decision algorithm described above is an example for realizing the present invention as well as the flow chart in FIG. 5, and a means which uses the evaluation function in practice.

Figure 5:
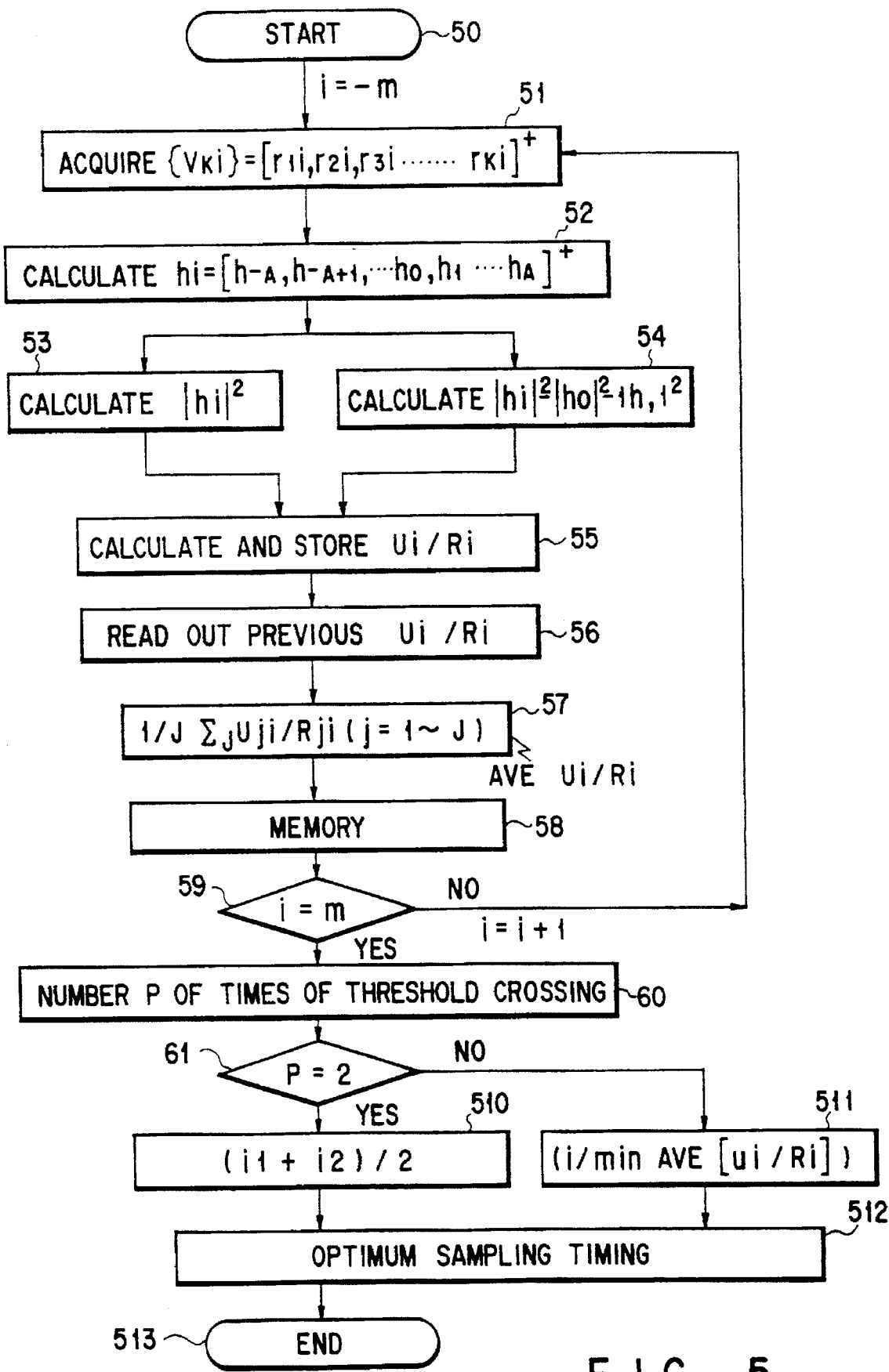
FIG. 5 is a flow chart showing the sequence of the sampling phase synchronizing scheme for the Viterbi equalizer according to the embodiment of the present invention.

FIG. 5 presents the flow chart of the operation sequence shown in the block diagram in FIG. 4, and an explanation will be given along the flow. Note that suffix i means the read-out order.

In step 51 after start step 50, a complex baseband received signal sequence {ri} unique to the readout time from the complex baseband received signal memory 19 shown in FIG. 1 is acquired. In step 52, a channel impulse response estimation value hi is calculated using {ri}. In step 53, a power value Ri of the calculated channel impulse response estimation value hi is calculated. In step 54, a power value Ui of an unnecessary one of taps of the calculated channel impulse response estimation value hi is calculated.

In step 55, a normalized undesired signal power value Ui/Ri is calculated. The calculated value is stored in the memory as Ui(k)/Ri(k). In step 56, a plurality of normalized undesired signal power values Ui(j)/Ri(j) (j=k−1 to k−j+1) calculated in the same sequence from steps 51 to 55 in the previously received slots are read out from the memory areas. In step 57, the average value of the normalized undesired signal power values is calculated based on the following equation:

$$\sum_{j=k-j+1}^{k} Ui(j)/Ri(j)/J$$

In step 58, the average value of the normalized undesired signal power values calculated in step 57 is temporarily stored in the memory. In step 59, the processes in steps 51 to 58 are executed for samples in a designated read-out period. For example, the processes in steps 51 to 58 are repeated W times (step 59).

In step 60, the number p of times of crossing of the W averaged normalized undesired signal power values unique to the readout times with respect to the threshold value is counted. If it is determined in step 61 that p is 2, the middle point of threshold crossing times (respectively represented by i1 and i2) is determined to be an optimum sampling reference time (step 510), i.e., i opt=(i1+i2)/2. If it is determined in step 61 that p is 3 or more, the time corresponding to a minimum one of the W averaged normalized undesired signal power values is determined to be an optimum sampling reference time (step 511), that is:

$$iopt=(i1 \min AVE[Ui(j)/Ri(j)]j=k-J+1 \text{ to } k)$$

In step 512, the optimum sampling reference time is supplied to the sampler 125 shown in FIG. 1, and the process ends.

Figure 6:
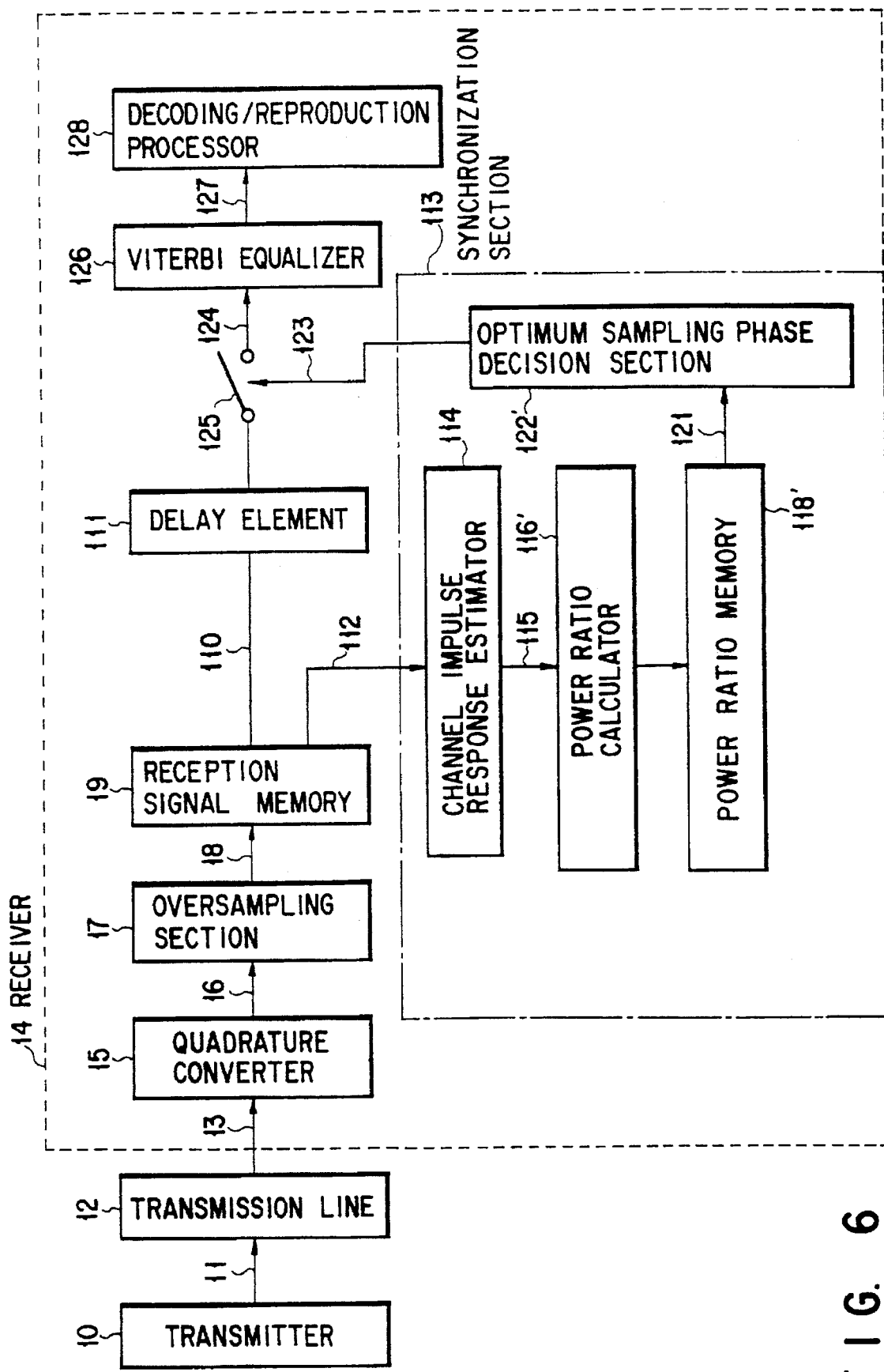
FIG. 6 is a block diagram of a receiver having a Viterbi equalizer added with a sampling phase synchronizing apparatus for a Viterbi equalizer as a modification of FIG. 1.
Figure 7A:
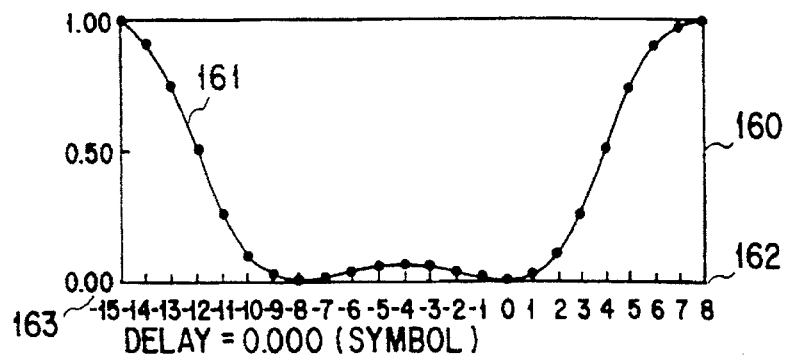
FIGS. 7A to 7E are graphs showing the characteristic curves of an averaged normalized undesired power $\zeta k(i)$ calculated in an actual multipath fading transmission channel environment according to the present invention.
Figure 7B:
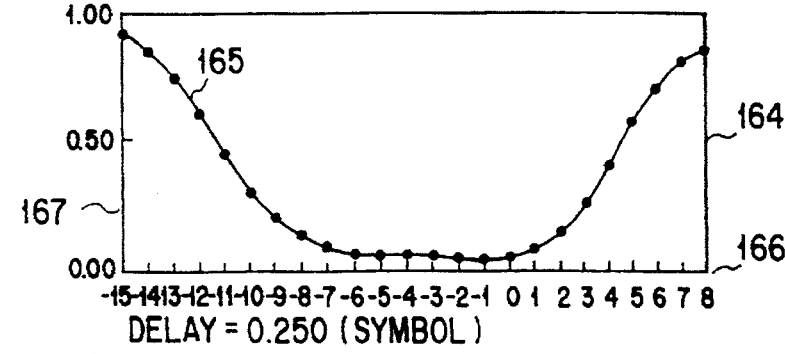
Figure 7C:
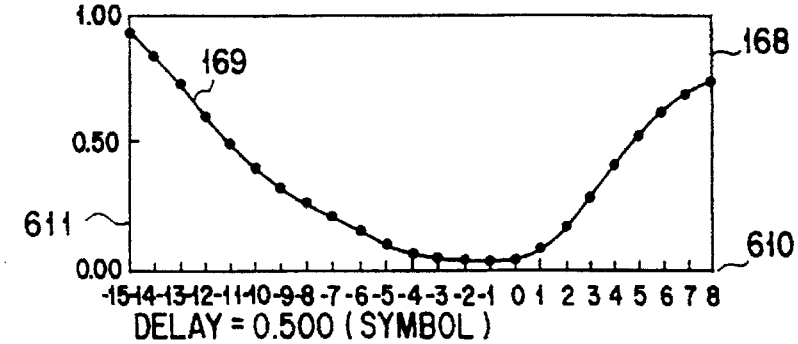
Figure 7D:
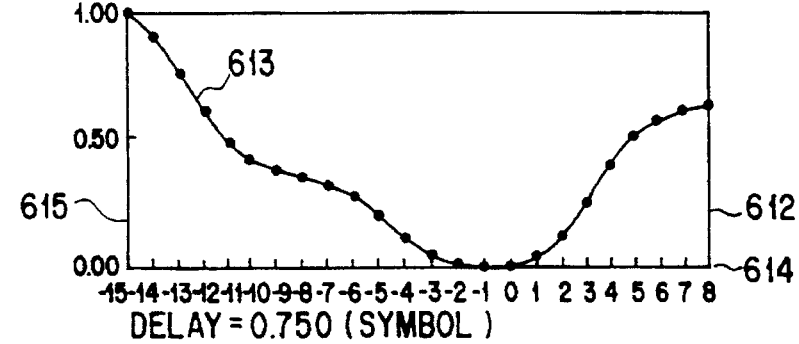
Figure 7E:
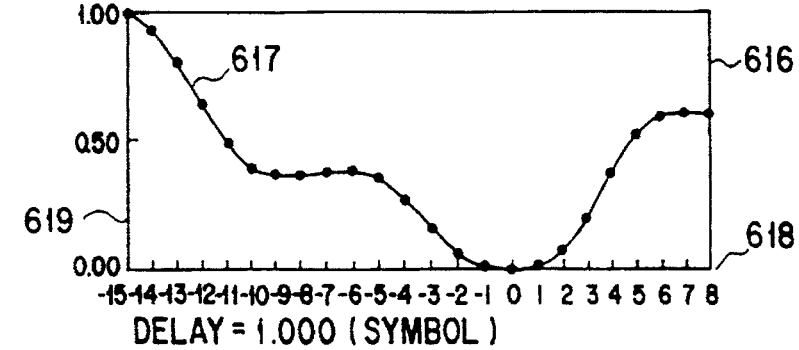
Figure 8:
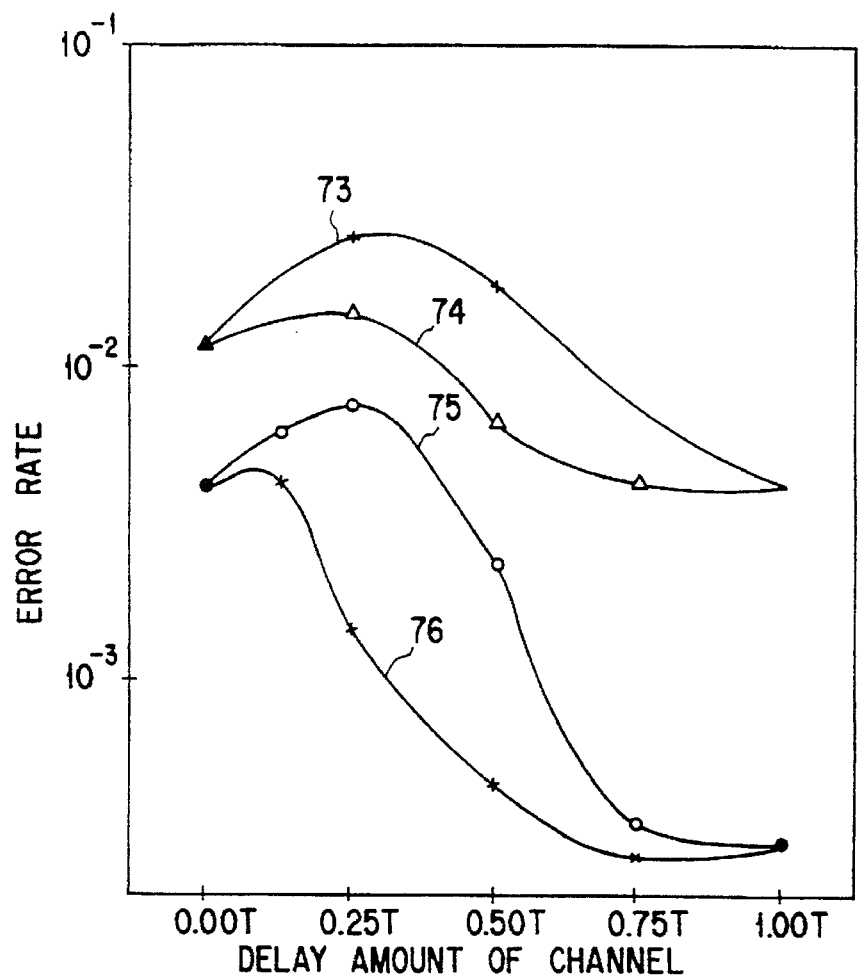
FIG. 8 is a graph showing the bit error rate characteristic curves calculated using an adaptive sampling phase synchronizing apparatus according to the present invention, and the bit error rate characteristic curves calculated by fixing sampling phase synchronization by a conventional sampling phase synchronizing scheme.

In the above-mentioned embodiment, an averaged normalized undesired signal power value is calculated by the averaged normalized undesired signal power calculator 120, and an optimum sampling tie is determined based on the calculation result. However, the averaged normalized undesired signal power calculator 120 is not always required. Therefore, as shown in FIG. 6, the output from the normalized undesired signal power calculator 116 may be supplied to the normalized undesired signal power memory 118, and the optimum sampling time may be determined on the basis of the normalized undesired signal power values read out from the normalized undesired signal power memory 118.

Note that the above-mentioned embodiment is an example for describing in detail the present invention, detailed numerals themselves described in this embodiment have no special meanings, and the description using variables (e.g., i, j, k, J, L, M, N, and the like) means that the present invention is generally applicable. The large differences from the conventional sampling phase synchronizing system and apparatus or the Viterbi equalizer insensitive to sampling phase synchronization are that a channel impulse response can be normally estimated in synchronism with a transmission channel even when the Viterbi equalizer itself is designed to have a minimum required scale, and the Viterbi equalizer which operates based on the estimated channel impulse response can have the best bit error rate performance. The description of the embodiment of the present invention is associated with only digital communications via a land mobile transmission channel. However, the apparatus of the present invention is not limited to the land digital mobile communications but is applicable to satellite communications and wire communications of a fixed network, which adopt the TDMA communication system.

As has been described in detail above, when a Viterbi equalizer is utilized as an equalizer for compensating for a distortion of a received signal from a transmission channel in a receiver of the digital communication system, a channel impulse response to be estimated by a channel impulse response estimator as one component of the Viterbi equalizer must be accurately simulated. This means synchronization to the transmission channel. The conventional sampling phase synchronizing apparatus which determines the peak time of a correlation value to be the reference time is often synchronized with the transmission channel with a time shift, and in such a case, the Viterbi equalizer cannot absorb the time shift, thus disrupting operations.

The present invention can solve the above-mentioned problems, and has an arrangement that allows synchronization with the transmission channel. The present invention can also solve the problem that a low bit error rate cannot be realized in a scheme for arranging a fractionally spaced channel impulse response estimation scheme to compensate a Viterbi equalizer with respect to a transmission channel for which an optimal sampling time cannot be originally defined, and for preventing disruptive deterioration of the bit error rate in a Viterbi equalizer having an arrangement which allows omission of a sampling phase synchronizing scheme. The above-mentioned problems can be solved by minimizing the power of an unnecessary tap in an estimated channel impulse response calculated using an adaptive algorithm such as an LS algorithm, which can estimate an accurate channel impulse response by an arithmetic operation, in units of samples obtained by oversampling a complex baseband received signal in the training sequence period in the TDMA slot at a period shorter than the transmission symbol transmission period. It can be easily understood upon inference that if a receiver can estimate a channel impulse response having the number of taps equal to that of an ideal channel impulse response, the power of an unnecessary tap in a channel impulse response estimated by a transversal filter prepared to have a length larger than the number of taps is unnecessary. Since the Viterbi equalizer forms an estimated received signal using an estimated channel impulse response, it can also be easily inferred that the number of errors can be smaller as an estimated channel impulse response having a length required for the Viterbi equalizer has a larger power. In a radio channel with rapidly varied characteristics, since the channel state at the beginning of a slot is often considerably different from that at the end of the slot, an averaging process is performed to realize optimum sampling phase synchronizing performance depending only on the delay dispersion amount (multipath delay amount) of the channel. With this process, a stable effect can be expected in every channel situations.

As described above, the sampling phase synchronizing apparatus of the present invention can assure the highest reliability of codes decoded by the Viterbi equalizer in a multipath fading channel environment unique to mobile communications.

A bidirectional maximum likelihood sequence estimation scheme corresponding to the function of the Viterbi equalizer 126 will be described below.

The bidirectional maximum likelihood sequence estimation scheme of the present invention is a system which takes notice of the fact that causes for determining bit errors in digital mobile communications are burst errors unique to mobile communications, and selectively switches a process between an optimum forward maximum likelihood sequence estimation process and backward maximum likelihood sequence estimation process by adaptively monitoring any decay of communication quality that causes burst errors while paying attention to an estimated channel impulse response obtained by a process for estimating a channel impulse response as one process of the maximum likelihood sequence estimation scheme in a channel environment, in which bit errors derived from the burst errors are generated, thereby consequently avoiding burst errors and saving codes which inadvertently suffer errors due to a delay of recover from error transmission.

The bidirectional maximum likelihood sequence estimation scheme will be described in detail below with reference to the accompanying drawings.

Figure 9:
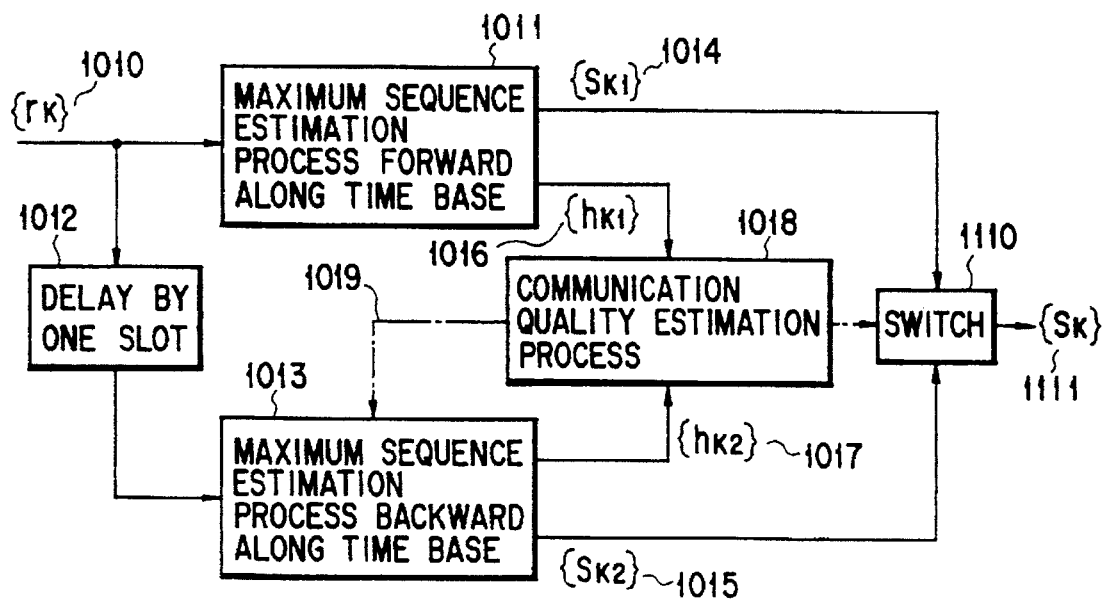
FIG. 9 is a schematic diagram showing of a bidirectional maximum likelihood sequence estimation scheme according to an embodiment of the present invention.

FIG. 9 is a block diagram for explaining the principle of the bidirectional maximum likelihood sequence estimation scheme according to the present invention. A digital movable terminal receives a received signal sequence {rk} 1010, and the received signal sequence {rk} 1010 is input to a forward maximum likelihood sequence estimation processor 1011 which operates forward along the time base. At the same time, the received signal sequence {rk} 1010 is delayed by a 1-slot delay block 1012 to be delayed by at least one slot time, and thereafter, the delayed received signal sequence {rk} 1010 is input to a backward maximum likelihood sequence estimation processor 1013 which operates backward along the time base.

An absolute value 1016 of a forward channel impulse response estimated by the forward maximum likelihood sequence estimation processor 1011 at time k is input to an evaluation unit 1018 for communication quality so as to be used as a reference for communication quality, and the forward communication quality is always estimated. When the forward communication quality does not decay, a forward maximum likelihood sequence estimation process result {sk1} 1014 is determined to be a final estimated sequence {sk} 1111. When the forward communication quality decays, a control signal 1019 for starting the backward maximum likelihood sequence estimation process is sent to the maximum likelihood sequence estimation processor 1013.

An absolute value 1017 of a backward channel impulse response estimated by the backward maximum likelihood sequence estimation processor 1013 is input to the communication quality estimation processor 1018 so as to be used as an evaluation function for communication quality, and the backward communication quality is always evaluated. When the backward communication quality does not decay, an estimated sequence {sk2} 1015 by the backward maximum likelihood sequence estimation processor 1013 is determined to be a finally estimated sequence {sk} 1111. On the other hand, when the backward communication result decays, the estimation result {sk1} 1014 or {sk2} 1015 in the process direction with a higher communication quality is selected by a switch 1110 to be a final estimation result {sk} 1111.

Figure 10:
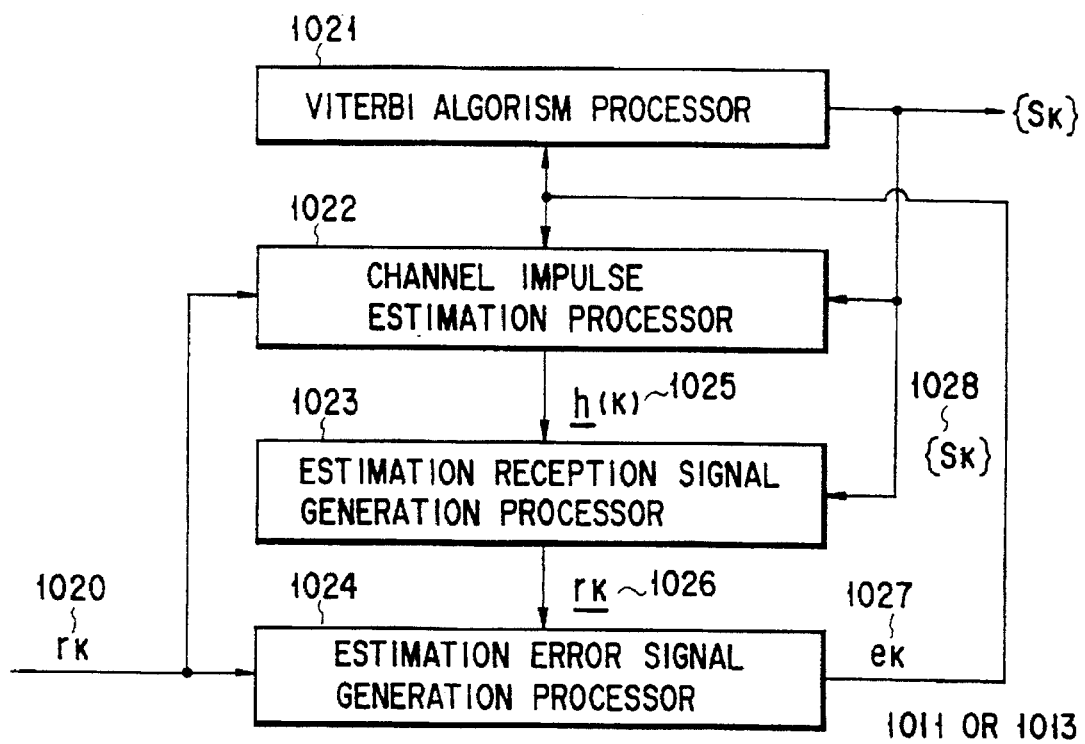
FIG. 10 is a block diagram of a maximum likelihood sequence estimation scheme executed by forward and backward processes in the system of the present invention.

FIG. 10 is a block diagram showing the detailed process sequence of the forward and backward maximum likelihood sequence estimation processors 1011 and 1013. Each of these processors comprises a Viterbi algorithm processor 1021 for estimating a transmitted signal sequence {sk} 1028 from a received signal rk on the basis of an estimated channel impulse response h(k−1) 1025, an estimation received signal formation processor 1023 for calculating an estimated received signal rk 1026 at time k on the basis of a training signal sequence or the transmitted signal sequence {sk} 1028 estimated by the Viterbi algorithm process, and the transmission impulse response h(k−1) 1025 estimated at time k−1, an error signal generation unit 1024 for estimated received signal, for forming an error signal ek 1027 between the received signal rk 1020 at time k and the estimated received signal rk 1026 at time k, and a channel impulse response estimator (adaptive tap weighth estimation unit) 1022 for estimating a channel impulse response h(k) 1025 at time k using an adaptive algorithm on the basis of the estimated error signal ek 1027.

FIG. 11 is a view showing the principle of the bidirectional maximum likelihood sequence estimation scheme of the present invention. Due to a channel with varied characteristics such as fading caused by a physical environment around a mobile station, received signal level Pow 1030 varies (1032) upon a change in time t 1031. When the TDMA communication system is used, a training signal sequence 1034 assigned to recognize a TDMA slot 1033 is added to the beginning of the TDMA slot 1033, and the slot 1033 is followed by a training signal sequence 1036 located at the beginning of the neighboring slot. Therefore, a data sequence 1035 is sandwiched between the training signal sequences 1034 and 1036.

Operation [A] will be explained below. When a forward process 1038 is performed for the slot 1033, a bit error is generated near time Tf 1037 at which the received level Pow 1030 decreases due to the above-mentioned channel with varied characteristics, and builds up a burst error 1311. On the other hand, an estimated sequence 1310 before generation of the bit error does not include any bit error. When a backward process 1039 is performed for the slot 1033, a bit error is similarly generated near time Tf 1037 at which the received level Pow decreases, and grows into a burst error 1312. An estimated sequence 1313 before generation of the bit error does not include any bit error. Thus, the bit error is generated in the maximum likelihood sequence estimation processes in both the directions after the time Tf at which the received signal level Pow becomes lowest due to the channel with varied characteristics. Therefore, the process direction of the maximum likelihood sequence estimation is switched by detecting this time Tf 1037, thereby improving reception characteristics.

Operation [B] will be described below. As a result of the forward process 1038 for this slot 1033, when no bit error is generated in an estimated sequence 1310 to the end of the slot 1033, i.e., when the communication quality does not decay, the backward process 1039 is not performed. More specifically, the backward process is not processed (1314), and the estimated sequence by the forward process 1038 is determined as the estimated sequence of this slot 1033.

Operation [C] will be explained below. When the forward process 1038 is performed for the slot 1033, a bit error is generated near the time Tf 1037 at which the received signal level Pow 1030 decreases due to the channel with varied characteristics, and grows into the burst error 1311, in the same manner as described above. As a result of the backward process 1039 for the slot 1033, when no bit error is generated in an estimated sequence 1313 to the beginning of the slot 1033, i.e., when the communication quality does not decay, the estimated sequence in the backward process 1039 is determined to be the estimated sequence of the slot 1033.

Figure 12:
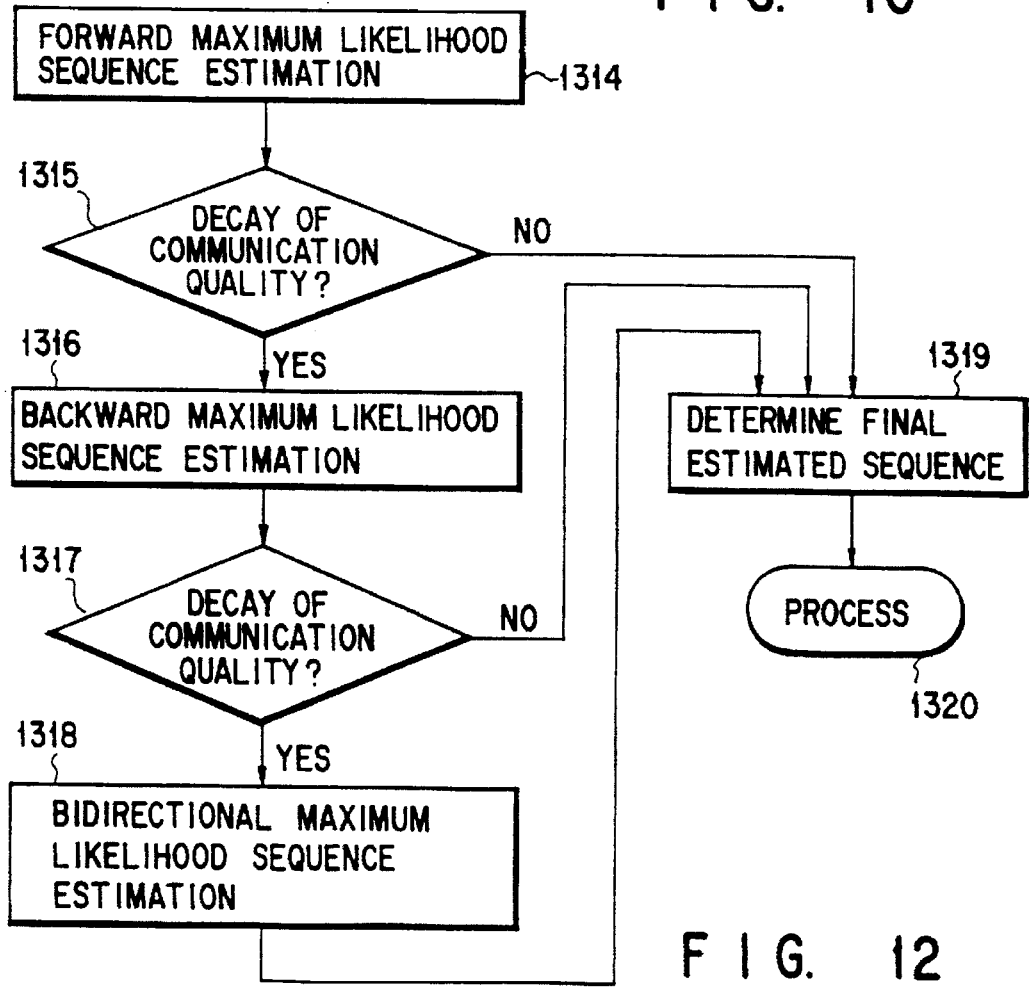
FIG. 12 is a flow chart showing the process of the bidirectional maximum likelihood sequence estimation scheme shown in FIG. 10.

This operation will be described below with reference to the flow chart shown in FIG. 12. The forward maximum likelihood sequence estimation process is performed (1314), and if no decay of communication quality is detected in the TDMA slot 1033 (1315), the estimated sequence in the forward maximum likelihood sequence estimation process (1314) is determined to be a final estimated sequence in the TDMA slot 1033 (1319). If a decay of communication quality is detected in the TDMA slot 1033 in the forward process (1315), the backward maximum likelihood sequence estimation process is performed (1316). If no decay of communication quality is detected in the backward process (1317), the estimated sequence in the backward maximum likelihood sequence estimation process (1316) is determined to be a final estimated sequence in the slot 1033 (1319). On the other hand, if a decay of communication quality in the TDMA slot 1033 is detected in the backward process (1317), a bidirectional maximum likelihood sequence estimation process is performed (1318), and the estimated sequence estimated by the forward maximum likelihood sequence estimation process and the estimated sequence estimated by the backward maximum likelihood sequence estimation process are combined as the final estimated sequence in the slot 1033 (1319), thus ending the processes (1320). Note that this embodiment has exemplified a method of performing the backward process only when a decay of communication quality is detected in the forward process. However, a method of performing the backward process independently of the presence/absence of a decay of communication quality may be adopted.

Figure 13:
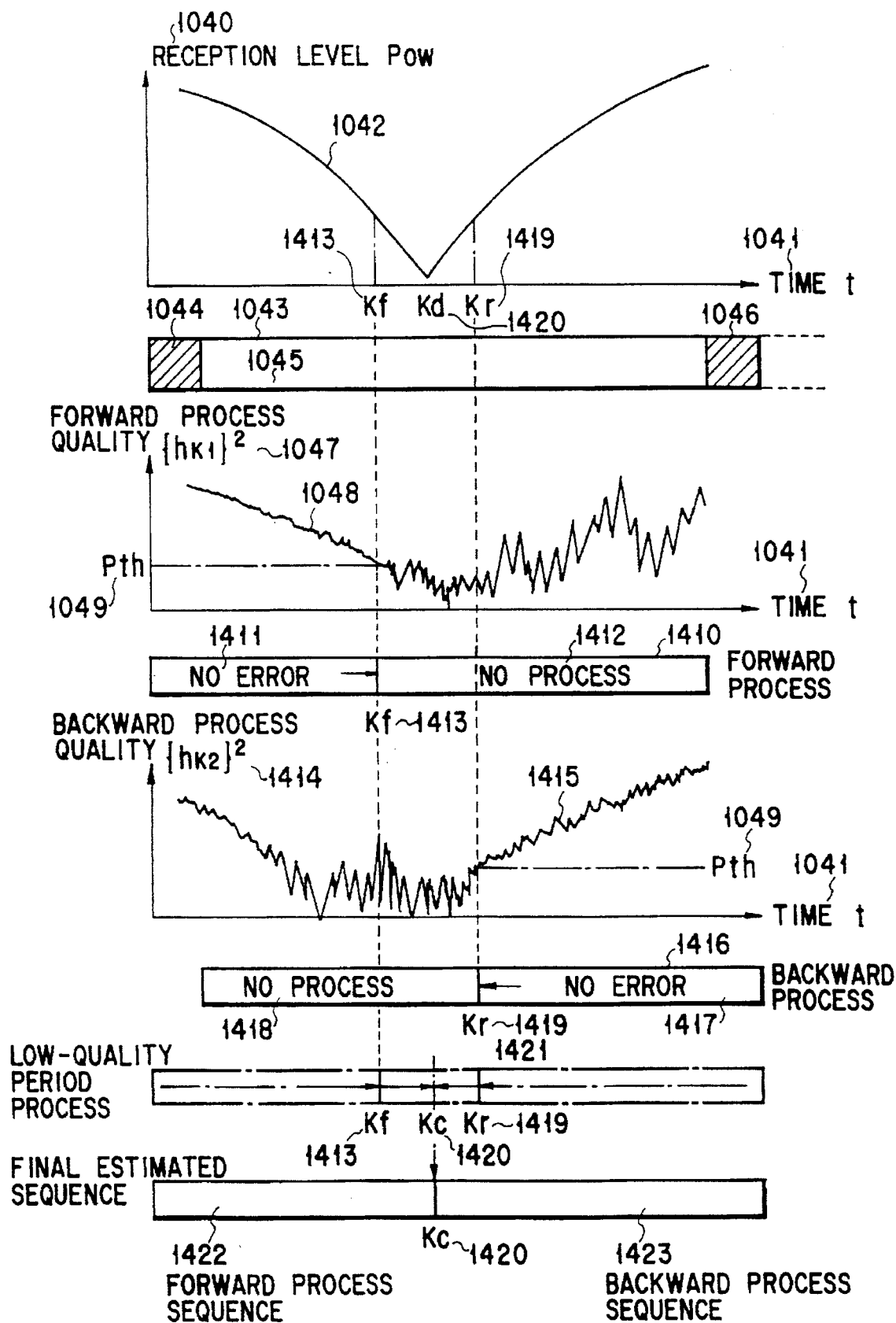
FIG. 13 is a view showing the process principle of a bidirectional maximum likelihood sequence estimation scheme according to another embodiment of the present invention.

FIG. 13 shows an example of the bidirectional maximum likelihood sequence estimation scheme of the present invention. Due to a fading variation unique to a mobile channel, received signal level Pow 1040 varies time by time as time t 1041 elapses, as denoted by reference numeral 1042. A known signal sequence 1044 is added at the beginning of a TDMA slot 1043, and is followed by a data sequence 1045. Thereafter, a training signal sequence 1046 of the neighboring slot is received. The power value of a forward channel impulse response estimated upon execution of each forward process of the slot 1043 is defined to be a forward process communication quality 1047, and a forward process 1410 is performed while monitoring a variation 1048 in the forward process communication quality 1047 until time kf 1413 at which the communication quality 1047 becomes lower than a predetermined threshold value Pth 1049. In FIG. 13, the forward process 1410 is performed to the end of the slot 1043. However, in practice, the forward process 1410 is temporarily interrupted at time kf 1413.

Then, a backward process 1416 is performed using the training signal sequence 1046 added in the vicinity of the slot 1043 in the backward direction along the time base. The power value of a backward channel impulse response estimated upon execution of each backward process 1416 of the slot 1043 is defined to be a backward process communication quality 1414, and the backward process 1416 is performed while observing a variation 1415 in the backward process communication quality 1414 until time kr 1419 at which the communication quality 1414 becomes lower than the predetermined threshold value Pth 1049. In FIG. 13, the backward process 1416 is similarly performed to the beginning of the slot 1043. However, in practice, the backward process 1416 is temporarily interrupted at time kr 1419. At this time, a forward sequence 1411 is estimated until time kf 1413 by the forward process 1410, and is not estimated after time kf. On the other hand, a backward sequence 1417 is estimated until time kr 1419 by the backward process 1416, and is not estimated after time kr.

As a result of the above-mentioned processes, a period 1421 of low communication-quality is defined by time kf 1413 and time kr 1419. Then, middle time kc 1420 between time kf 1413 and time kr 1419 is calculated, and the forward process 1410 is restarted from time kf 1413 to time kc 1420, so that a maximum likelihood sequence estimation process 1422 from the beginning of the TDMA slot 1043 to time kc is finally performed in the forward process 1410. Then, the backward process 1416 is restarted from time kr 1419 to time kc 1420, so that a maximum likelihood sequence estimation process 1423 from the end of the TDMA slot 1043 to time kc 1420 is finally performed in the backward process 1416.

FIGS. 14A through 14D show an embodiment for explaining a reference for estimating decay of communication quality. Since the Viterbi algorithm process is performed in the maximum likelihood sequence estimation scheme, ambiguities corresponding to the number of states remain at time k 1511. FIGS. 14A through 14D illustrates a trellis diagram of an example of a 4-state Viterbi algorithm, and survival paths 1055, 1056, 1057, and 1058 are respectively connected to states 1051, 1052, 1053, and 1054 at time k 1511 along a time base t 1050. The states 1051, 1052, 1053, and 1054 respectively hold their own estimated channel impulse responses.

However, only one correct survival path at time k 1511 must be present, and also only one correct channel impulse response at time k 1511 must be present. Therefore, the channel impulse response at time k 1511 has no accuracy, and cannot be serve as a reference for estimating decay of communication quality. For this reason, merge time k–mf 1059 at which the survival paths 1055, 1056, 1057, and 1058 connected to the states 1051, 1052, 1053, and 1054 at time k 1511 become a single sequence 1510 is searched. Since only one estimated channel impulse response is available at time k–mf, the power value of a channel impulse response estimated based on a survival path 1510 at merge time k–mf 1059 is used as the reference for estimating the communication quality at time k 1511.

Similarly, since the Viterbi algorithm process is performed in the backward maximum likelihood sequence estimation scheme, ambiguities corresponding to the number of states remain at time k 1512, and survival paths 1518, 1519, 1520, and 1521 are respectively connected to states 1514, 1515, 1516, and 1517 at time k 1512 along the time base t 1050. Since the maximum likelihood sequence estimation scheme estimates a channel impulse response in units of states, the states 1514, 1515, 1516, and 1517 respectively hold their own estimated channel impulse responses. However, only one correct survival path at time k 1512 should be present, and also only one correct channel impulse response at time k 1512 should be present.

Therefore, the channel impulse response at time k 1512 has no accuracy, and cannot serve as a reference for estimating communication quality.

For this reason, merge time k–mf 1513 at which the survival paths 1518, 1519, 1520, and 1521 connected to the states 1514, 1515, 1516, and 1517 at time k 1512 become a single sequence 1522 is searched. Since only one estimated channel impulse response is present at time k–mf 1513, the power value of a channel impulse response estimated based on a survival path 1522 at merge time k–mf 1059 is used as the reference for estimating the communication quality at time k 1512.

Figure 14A:
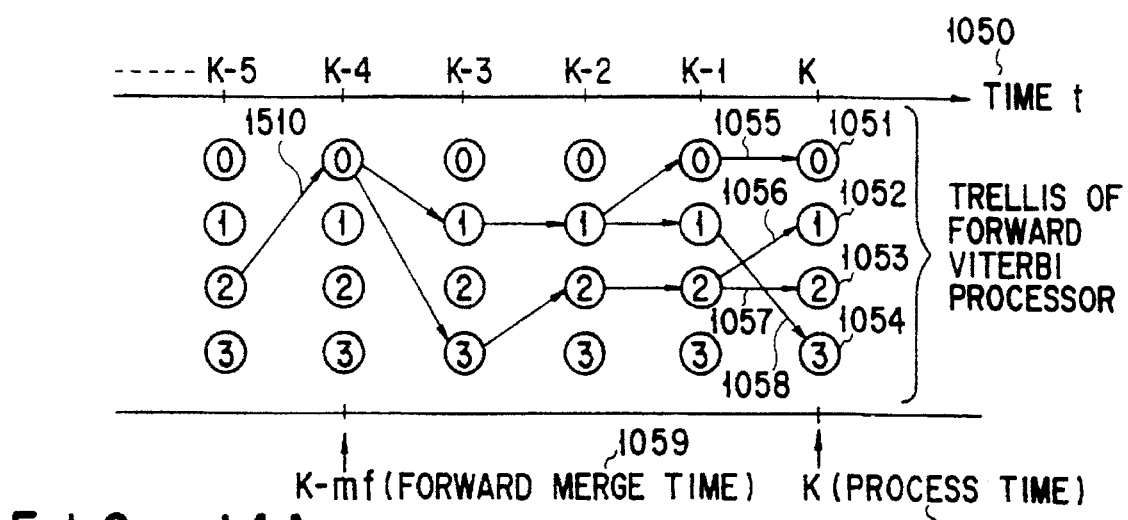
FIGS. 14A through 14D are views for explaining the reference for estimating decay of communication quality in the bidirectional maximum likelihood sequence estimation scheme according to another embodiment of the present invention.
Figure 14B:
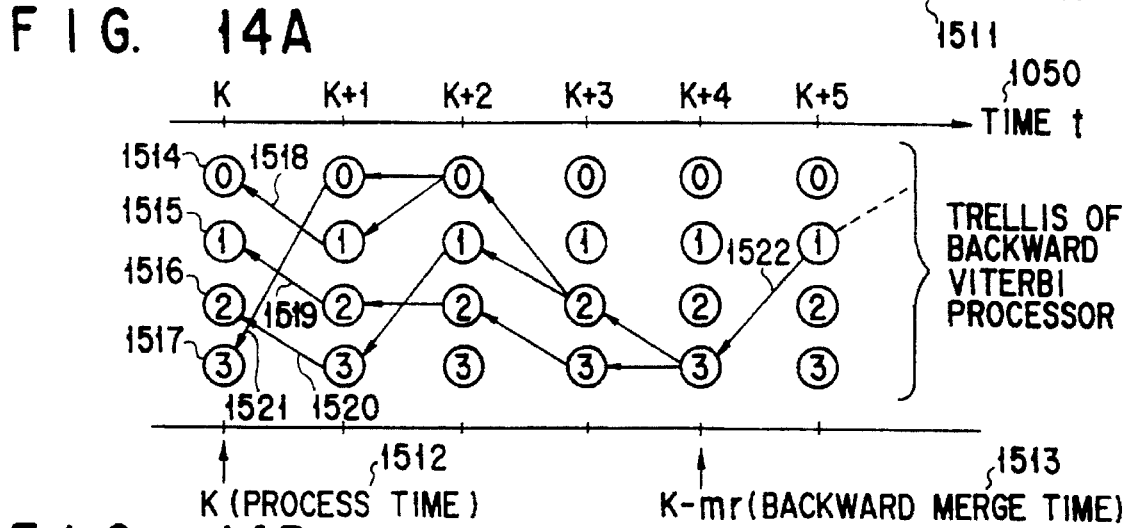
Figure 14C:
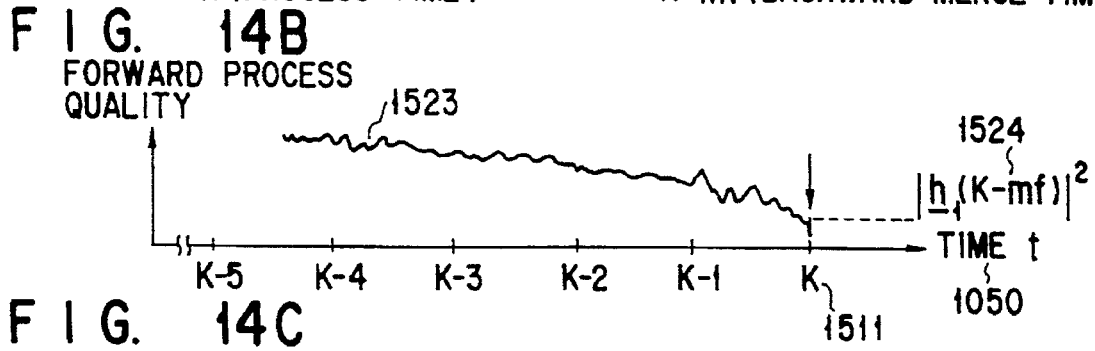
Figure 14D:
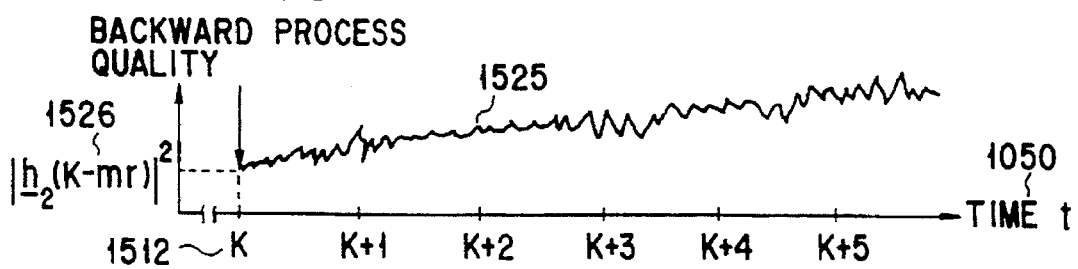

More specifically, as can be seen from FIGS. 14C and 14D, a forward communication quality 1523 always observed during the forward process is a communication quality 1524 at time k 1511, and a backward communication quality 1525 always observed during the backward process is a communication quality 1526 at time k 1512.

Figure 15A:
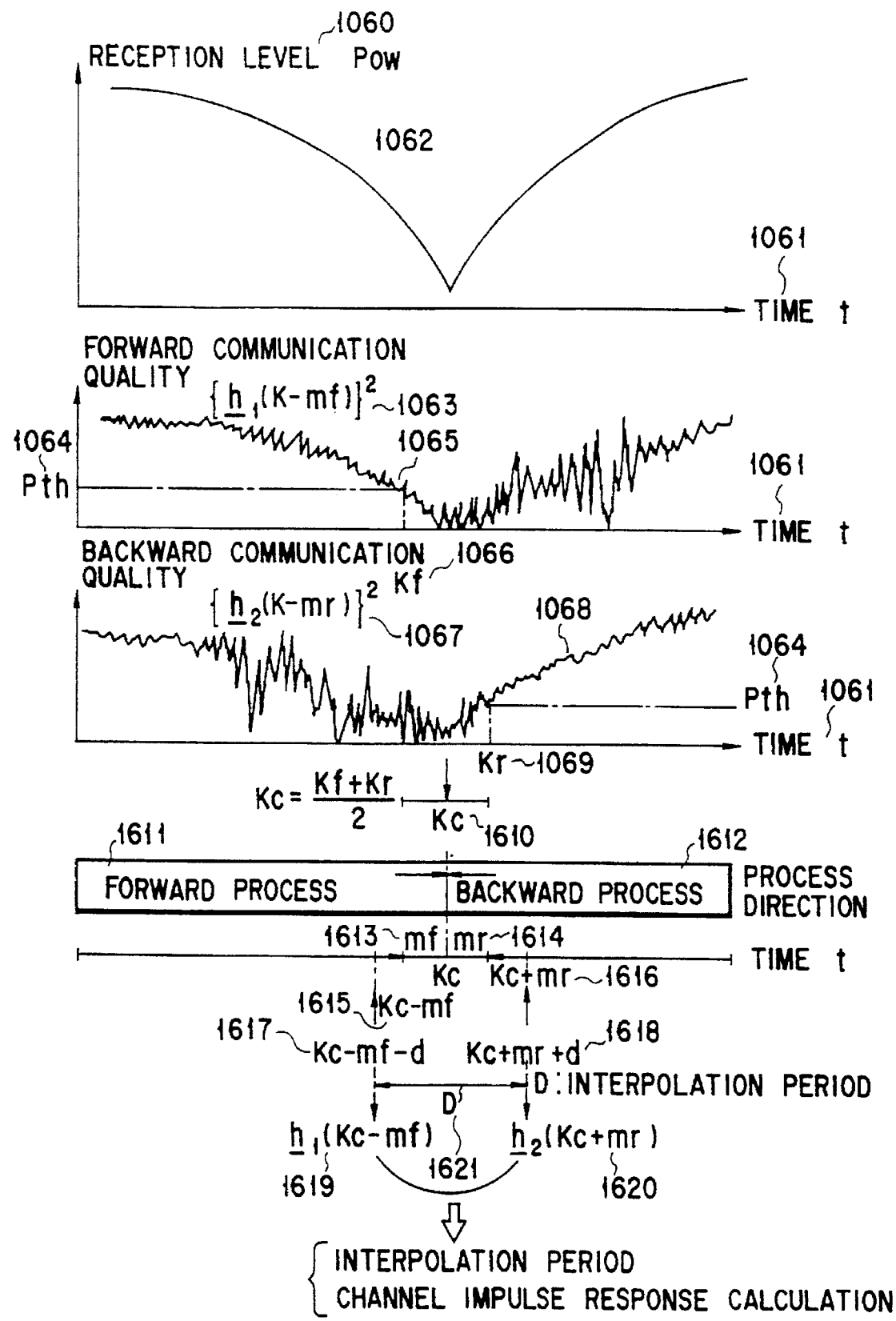
FIGS. 15A and 15B are views showing the process principle of a bidirectional maximum likelihood sequence estimation scheme according to another embodiment of the present invention.
Figure 15B:
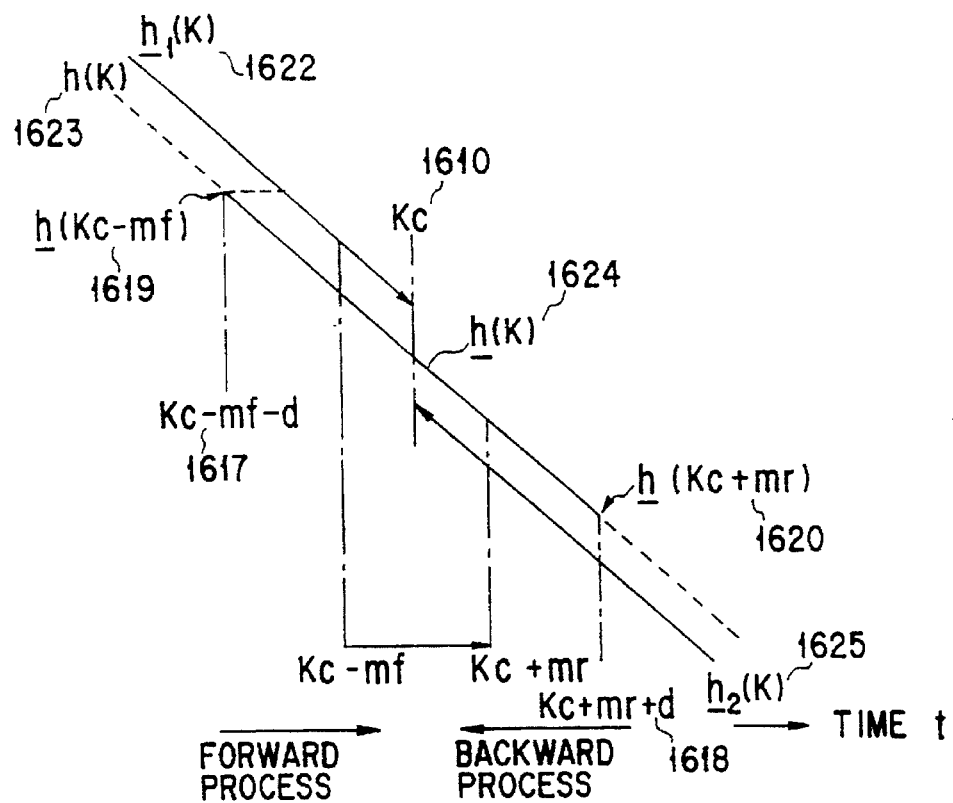

FIGS. 15A and 15B show the second embodiment according to the present invention. Due to a fading variation unique to mobile communications, received signal level Pow 1060 varies (1062) as time t 1061 elapses. A forward maximum likelihood sequence estimation process 1611 is started using a sequenceing sequence added at the beginning of a TDMA slot of interest, and a forward communication quality 1063, which is calculated based on a forward channel impulse response h1(k–mf) obtained in a series of maximum likelihood sequence estimation processes is always observed. The time at which a variation 1065 in forward communication quality becomes lower than a predetermined threshold value Pth 1064 is defined as time kf 1066, and the forward process is temporarily interrupted.

Then, a backward maximum likelihood sequence estimation process 1612 is started using a training signal sequence added to the beginning of the neighboring slot of the TDMA slot of interest, and a backward communication quality 1067 calculated from a backward channel impulse response h2(k+mr) obtained in a series of maximum likelihood sequence estimation processes is always observed. The time at which a variation 1068 in backward communication quality becomes lower than the predetermined threshold value Pth 1064 is defined as time k 1069, and the backward process is temporarily interrupted. Then, middle time kc 1610 between time kf 1066 and time kr 1069 is calculated to restart the backward process 1611 from time kf 1066 to time kc 1610, and to restart the backward process 1612 from time kr 1069 to time kc 1610. Then, estimated sequence merge time kc–mf 1615 of the forward process 1611 at time kc 1610 and estimated sequence merge time kc+mr 1616 of the backward process 1612 at time kc 1610 are calculated.

Since the adaptive algorithm for estimating a channel impulse response in the maximum likelihood sequence estimation scheme inevitably includes an estimation delay d, a transmission impulse response h1(kc–mf) 1619 estimated based on the merge sequence at time kc–mf 1615 becomes a channel impulse response at time k–mf–d 1617. Similarly, a channel impulse response h2(kc+mr) 1620 estimated based on the merge sequence at time kc+mr 1616 becomes a channel impulse response at time kc+mr+d 1618. Therefore, an interpolation period (D) 1621 of this embodiment is defined between time (kc–mf–d) 1617 and time (kc+mr+d) 1618, and channel impulse responses serving as references for a channel impulse response h(k) 1624 during the interpolation period (D) 1621 are the responses h1(kc–mf) 1619 and h2(kc+mr) 1620.

Using the obtained channel impulse response h(k) 1624 during the interpolation period 1621, maximum likelihood sequence estimation of the interpolation period D 1621 is performed. An estimated sequence before the interpolation period (D) 1621 is obtained from the forward process 1611, and an estimated sequence after the interpolation period (D) 1621 is obtained from the backward process 1612.

Figure 16:
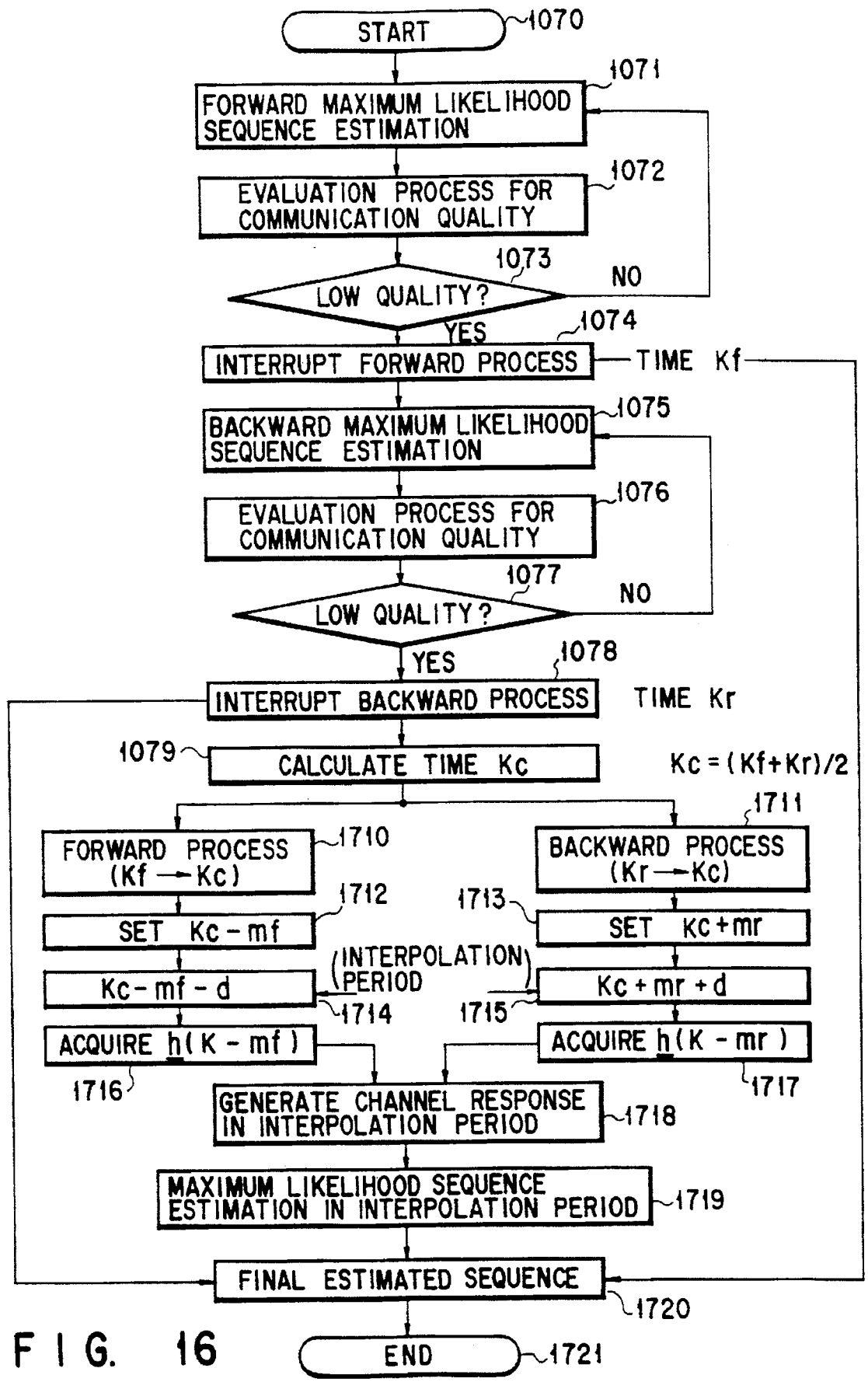
FIG. 16 is a flow chart for explaining the process flow of the bidirectional maximum likelihood sequence estimation scheme according to the embodiment of the present invention.

FIG. 16 is a flow chart showing the maximum likelihood sequence estimation processes of the above-mentioned second embodiment.

More specifically, after the flow starts, a forward maximum likelihood sequence estimation process is performed (step 1071). Then, a communication quality estimation process is performed (step 1072). It is checked in step 1073 if a quality decay is present. If YES in step 1073, the forward process is interrupted (step 1074). However, if NO in step 1073, the flow returns to step 1071.

After the forward process is interrupted, a backward maximum likelihood sequence estimation process and a communication quality estimation process are performed in turn (steps 1075 and 1076). It is checked in step 1077 if a quality decay is present. If YES in step 1077, the backward process is interrupted (step 1078); otherwise, the flow returns to step 1079.

In step 1079 after interruption of the backward process, time kc is calculated. Thereafter, the forward process (kr→kc) (step 1710), a setting process of kc−mf (step 1712), a process of kc−mf−d (step 1714), and acquisition of h(k−mf) (step 1716) are performed in turn, and the backward process (kr→kc) (step 1711), a setting process of kc+mf (1713), a process of kc+mr+d (step 1715), and acquisition of h(k+mr) (step 1717) are performed in turn.

In step 1718, a channel response in the interpolation period is formed, and thereafter, a maximum likelihood sequence estimation process in the interpolation period is performed (step 1719). In step 1720, a final estimated sequence is searched, and the process ends. Note that the final estimated sequences are calculated after interruption of the forward process in step 1074 and after interruption of the backward process in step 1078.

Figure 17B:
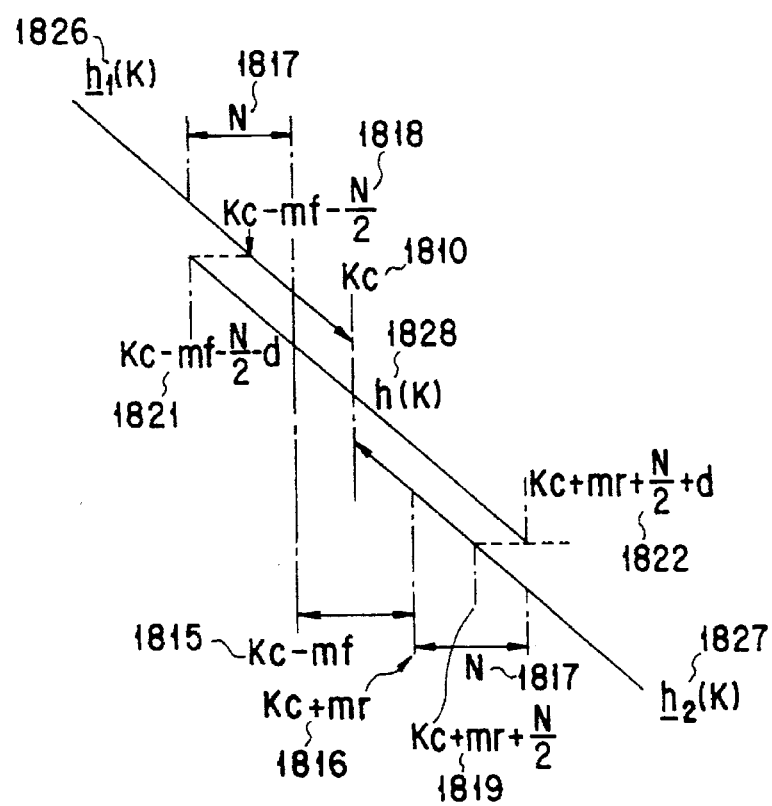
FIGS. 17A and 17B are view showing the process principle of a bidirectional maximum likelihood sequence estimation scheme according to another embodiment of the present invention.
Figure 17A:
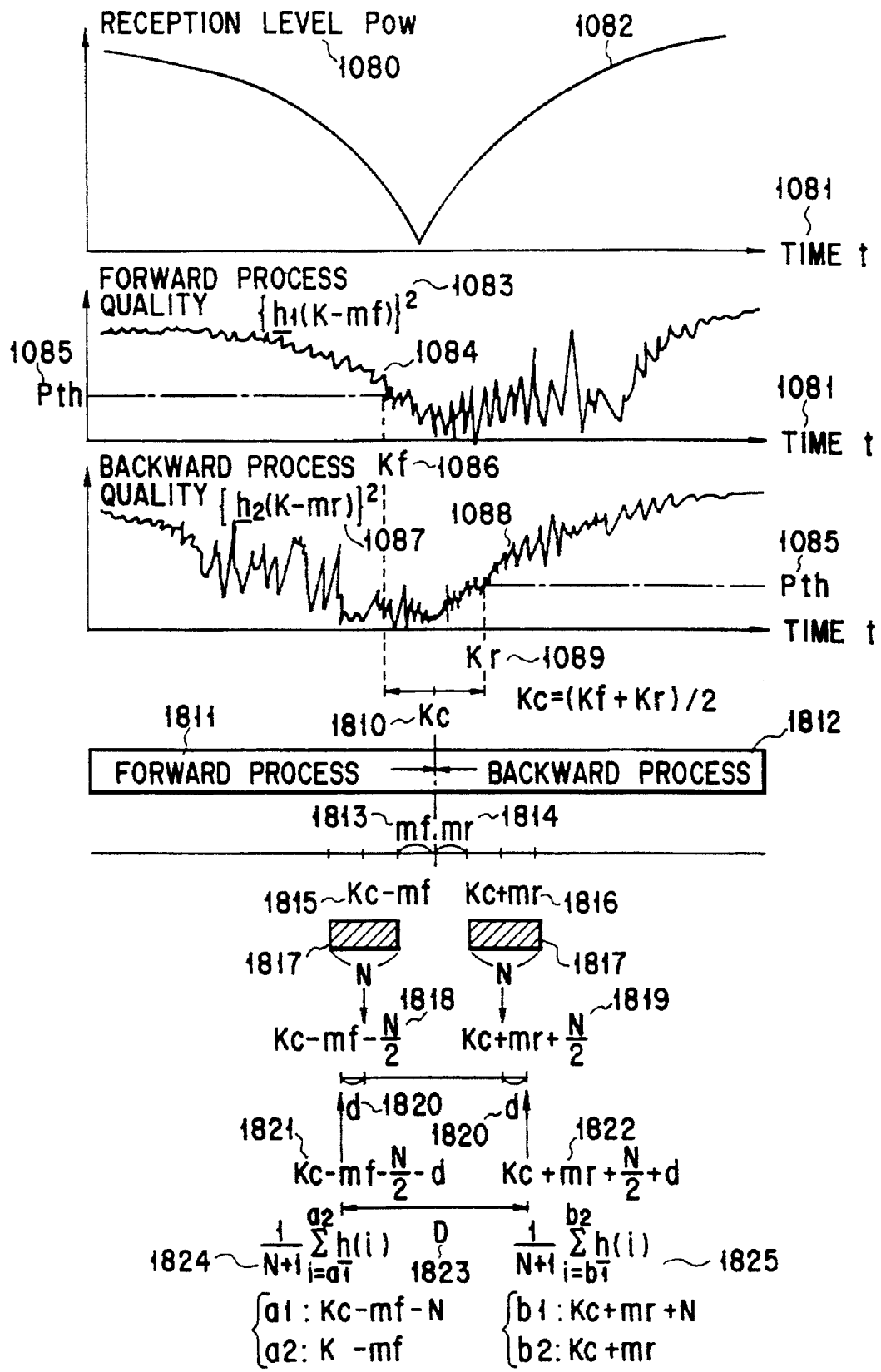

FIGS. 17A and 17B are views for explaining in detail the third embodiment according to the present invention. Due to a fading variation 1082 unique to mobile communications, received signal level Pow 1080 varies as an elapse of time t 1081. A forward maximum likelihood estimation process 1811 is started using a training signal sequence added at the beginning of a TDMA slot of interest, and a forward communication quality 1083 calculated from a forward channel impulse response h1(k−mf) obtained in a series of maximum likelihood sequence estimation processes is always observed. The time at which a variation 1084 in the forward communication quality becomes lower than a predetermined threshold value Pth 1085 is defined to be time kf 1086, and the forward process is temporarily interrupted.

Then, a backward maximum likelihood sequence estimation process 1812 is started using a training signal sequence added to the beginning of the neighboring slot of the TDMA slot of interest, and a backward communication quality 1087 calculated from a backward channel impulse response h2(k+mr) obtained in a series of maximum likelihood sequence estimation processes is always observed. The time at which a variation 1088 in backward communication quality becomes lower than the predetermined threshold value Pth 1085 is defined to be time kr 1089, and the backward process is temporarily interrupted. Then, middle time ck 1810 between time kf 1086 and time kr 1089 is calculated to restart the forward process 1811 from time kf 1086 to time kc 1810 and to restart the backward process 1812 from time kr 1089 to time kc 1810.

Estimated sequence merge time kc−mf 1815 of the forward process 1811 at time kc 1810 and estimated sequence merge time kc+mr 1816 of the backward process 1812 at time kc 1810 are calculated. A channel impulse response calculated by the adaptive algorithm is influenced by noise, and if an instantaneous channel impulse response is used as a reference for calculating a transmission impulse response h(k) 1828 during the interpolation period, a large error due to the noise appears. For this reason, an average value 1824 of N+1 forward channel impulse responses estimated in accordance with an estimated sequence which merged an N time period 1817 before time kc−mf 1815 is calculated. The forward averaged channel impulse response 1824 is defined to be an estimated channel impulse response at time kc−mf−N/2−d 1821 in consideration of a delay due to averaging and an estimation delay d 1820 in the adaptive algorithm.

Similarly, in the backward process, an average value 1825 of N+1 backward channel impulse responses estimated in accordance with an estimated sequence which merged an N time period 1817 before time kc+mf 1816 (in the future along the time base) is calculated, and the backward averaged channel impulse response 1825 is defined to be a channel impulse response at time kc+mr+N/2+d 1822 in consideration of a delay due to averaging and the estimation delay d 1820 of the adaptive algorithm.

With the above-mentioned setting processes, an interpolation period D 1823 is defined between time kc−mf−N/2−d 1821 and time kc+mr+N/2+d 1822. Therefore, in this embodiment, a channel impulse response h(k) 1828 during the interpolation period D 1823 is calculated from the forward averaged channel impulse response 1824 and the backward averaged channel impulse response 1825, and maximum likelihood sequence estimation during the interpolation period D 1823 is performed using h(k). An estimated sequence before the interpolation period D 1823 is obtained from the forward process 1811, and an estimated sequence after the interpolation period D 1823 is obtained from the backward process 1812.

Figure 18:
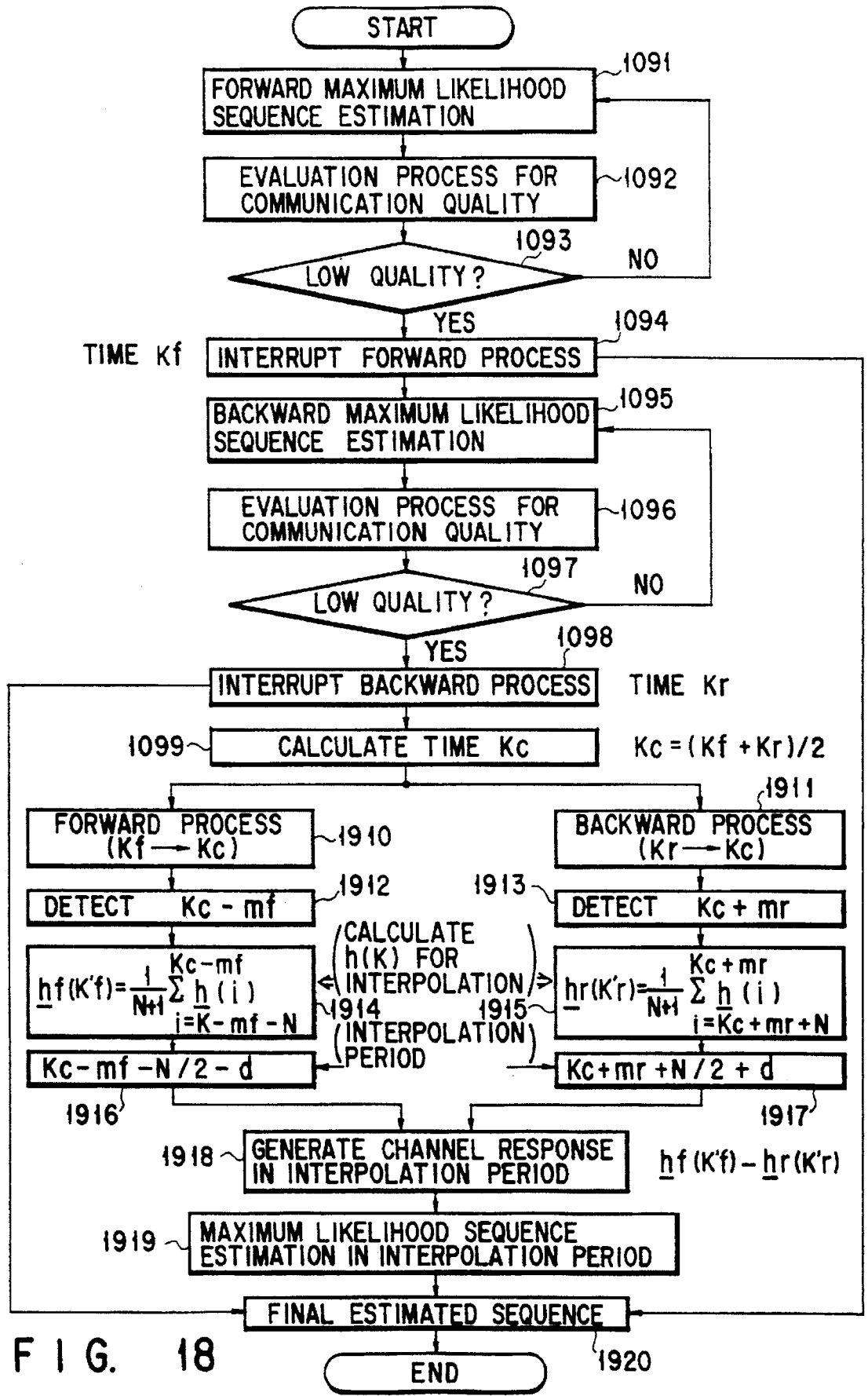
FIG. 18 is a flow chart for explaining the process flow of the bidirectional maximum likelihood sequence estimation scheme shown in FIGS. 17A and 17B.

FIG. 18 is a flow chart for explaining the third embodiment according to the present invention, and the operation sequence and order are the same as those in the above detailed description of FIGS. 17A and 17B.

More specifically, after the flow starts, a forward maximum likelihood sequence estimation process and a communication quality estimation process are performed in turn (steps 1091 and 1092). Thereafter, any quality decay is checked in step 1093. If YES in step 1093, the forward process is interrupted (step 1094); otherwise, the flow returns to step 1091. After the forward process is interrupted, a backward maximum likelihood sequence estimation process and a communication quality estimation process are performed in turn (steps 1095 and 1096). At this time, any quality decay is checked (step 1097). If YES in step 1097, the backward process is interrupted (step 1098); otherwise, the flow returns to step 1095.

After interruption of the backward process, time kc is calculated (step 1099). When time kc is calculated, the forward process (kf→kc) and the backward process (kr→kc) are performed (steps 1910 and 1911). Thereafter, detections of kc−mf and kc+mr (steps 1912 and 1913), calculations of h(k) for interpolation (steps 1914 and 1915), and calculations of the interpolation period (steps 1916 and 1917) are performed.

After the interpolation period is calculated, a channel response in the interpolation period is formed (step 1918), and subsequently, maximum likelihood sequence estimation in the interpolation period is performed (step 1919). Then, a final estimated sequence is calculated (1920), and the process ends.

Note that the flow can advance to a process for calculating the final estimated sequence after interruption of the forward process (step 1094) and after interruption of the backward process (step 1098).

Figure 19:
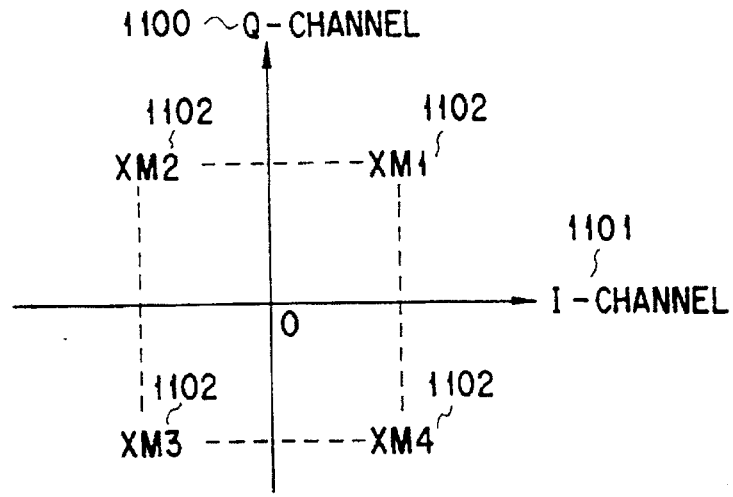
FIG. 19 is a schematic view for explaining a scheme for synchronizing a forward estimated channel impulse response hf(kf) and a backward estimated channel impulse response hf(kf') upon calculation of a channel impulse response in an intra-interpolation period.
Figure 20:
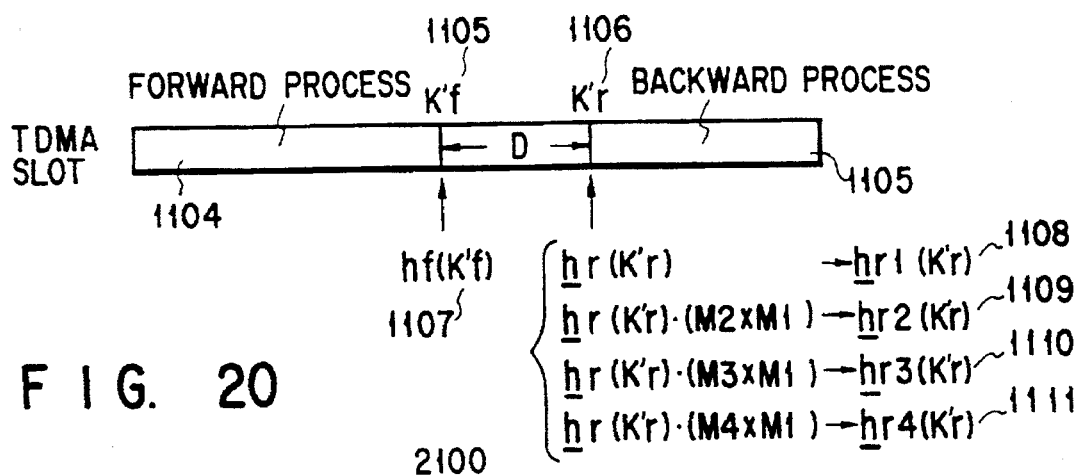
FIG. 20 is a view showing a TDMA slot associated with FIG. 19.

FIGS. 19, 20, and 21 are respectively schematic views and a flow chart showing an example of means for synchronizing a channel impulse response hf(kf') 1107 obtained from a forward maximum likelihood sequence estimation process 1104 and a channel impulse response hr(kr') 1108 obtained from a backward maximum likelihood sequence estimation process 1105 with each other so as to calculate a channel impulse response during the interpolation period in the system of the present invention.

For example, assuming four-phase modulation such as QPSK, signal points are arranged on a quadrature coordinate system (defined by an I-channel 1101 and a Q-channel 1100), as shown in FIG. 19. That is, signal points M2 and M4 are arranged at positions qc/2 and a signal point M3 is arranged at a position qc with reference to a signal point M1 1102. In general, since a data sequence in a TDMA slot 1103 is unknown, a signal point position from which a sequencing sequence located at the beginning of the neighboring slot is mapped is unknown, and especially in differential coding, the position is not known at all.

However, in, e.g., QPSK, since data transmitted from a transmitter is one of M1 to M4 1102 at any time, the phase relationship between the channel impulse response hf(kf') estimated in the forward process 1104 and the channel impulse response hf(kf') 1108 estimated in the backward process 1105 is one of 0 [rad], qc/2 [rad], and c [rad].

Therefore, as the estimated channel impulse response h(k) in the interpolation period D, with reference to the response hf(kf') 1107, a response hr1(kr') 1108 obtained by phase-rotating hr(kr') 1108 by 0 [rad], a response hr2(kr') 1109 obtained by phase-rotating the response hr1(kr') 1108 by c/2 [rad], a response hr3(kr') 1110 obtained by phase-rotating the response hr(kr') 1108 by c [rad], and a response hr4(kr') 1111 obtained by phase-rotating the response hr1(kr') 1108 by −c/2 [rad] are prepared.

The maximum likelihood sequence estimation during the interpolation period is performed by estimating a channel impulse response during the interpolation period D using the responses hf(kf') 1107 and hr1(kr') 1108, thereby selecting an estimated sequence having a minimum path metric pm1 during the interpolation period. Similarly, the maximum likelihood sequence estimation during the interpolation period is performed by estimating a channel impulse response during the interpolation period D using the responses hf(kf') 1107 and hr2(kr') 1109, thereby selecting an estimated sequence having a minimum path metric pm2 during the interpolation period. Similarly, the maximum likelihood sequence estimation during the interpolation period is performed by estimating a channel impulse response during the interpolation period D using the responses hf(kf') 1107 and hr3(kr') 1110, thereby selecting an estimated sequence having a minimum path metric pm3 during the interpolation period. Similarly, the maximum likelihood sequence estimation during the interpolation period is performed by estimating a channel impulse response during the interpolation period D using the responses hf(kf') 1107 and hr4(kr') 1111, thereby selecting an estimated sequence having a minimum path metric pm4 during the interpolation period.

As described above, of the maximum likelihood sequence estimation processes performed using the same number of channel impulse responses in the interpolation period as the number of signal points, an estimated sequence having the minimum path metric is determined as a final estimated sequence in the interpolation period. This process sequence is as shown in FIG. 21.

More specifically, after the flow starts, hf(kf') is acquired (step 2013). Thereafter, hr1(kr'), hr2(kr'), hr3(kr'), and hr4(kr') are formed (steps 2014, 2015, 2016, and 2017). Then, interpolation periods h(k)1, h(k)2, h(k)3, and h(k)4 are calculated (steps 2018, 2019, 2020, and 2021). Furthermore, maximum likelihood sequence estimation processes (1), (2), (3), and (4) during the interpolation periods are performed (steps 2022, 2023, 2024, and 2025). Thereafter, minimum path metrics pm1, pm2, pm3, and pm4 are obtained (steps 2026, 2027, 2028, and 2029). A minimum path metric pm is selected from the obtained minimum path metrics pm1, pm2, pm3, and pm4 in step 2030. Thereafter, a maximum likelihood sequence having the minimum path metric pm is selected (step 2031), and the process ends.

Figure 22:
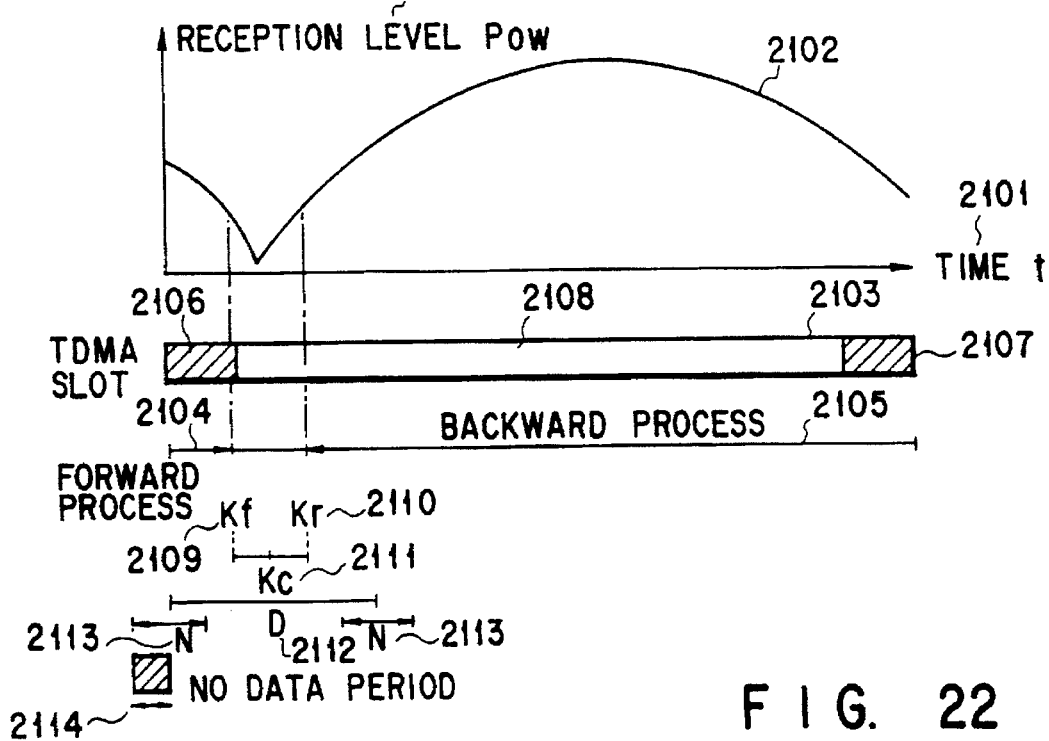
FIG. 22 is a view for explaining the principle of a process executed when the bidirectional maximum likelihood sequence estimation scheme cannot be executed.

FIG. 22 shows an embodiment associated with processes when the bidirectional maximum likelihood sequence estimation scheme according to the present invention cannot be executed. Due to a fading variation 2102 unique to mobile communications, received signal level Pow 2100 varies as time t 2101 elapses. A forward maximum likelihood sequence estimation process 2104 is started using a training signal sequence 2106 added at the beginning of a TDMA slot 2103, and the time at which the forward communication quality calculated from a forward channel impulse response h1(k−mf) obtained by a series of maximum likelihood sequence estimation processes becomes lower than a predetermined threshold value Pth is defined to be time kf 2109. A backward process 2105 is started using a training signal sequence 2107 located at the beginning of the neighboring slot following the end, the TDMA slot 2103, and the time at which the backward communication quality calculated from a backward channel impulse response h2(k+mr) obtained by a series of maximum likelihood sequence estimation processes becomes lower than the predetermined threshold value Pth is defined to be time kr 2110.

In this case, time kc 2111 defined based on time kf 2109 and time kr 2110 is located at the beginning of a data sequence 2108 in the TDMA slot 2103, and even if an interpolation period D 2112 can be set within the TDMA slot 2103, a sufficient time window width N 2113 required for calculating an averaged channel impulse response in the forward direction as a reference for estimating a channel impulse response during the interpolation period cannot be assured in the TDMA slot 2103, and extends beyond the slot by a time period tnd 2114. In this case, in the bidirectional maximum likelihood sequence estimation scheme of the present invention, the backward maximum likelihood sequence estimation process result starting from the training signal sequence 2107 is used as an estimated sequence in this TDMA slot 2103.

Although not shown in FIG. 22, when time kc 2111 is located near the end of the TDMA slot 2103, even if an interpolation period D 2112 can be set within the TDMA slot 2103, a sufficient time window width N 2113 required for calculating an averaged channel impulse response in the backward direction as a reference for estimating a channel impulse response during the interpolation period cannot be assured in the TDMA slot 2103, and extends beyond the slot by the time period tnd 2114, contrary to the above-mentioned case. In this case, in the bidirectional maximum likelihood sequence estimation scheme of the present invention, the forward maximum likelihood sequence estimation process result starting from the training signal sequence 2106 is used as an estimated sequence in this TDMA slot 2103.

Figure 23:
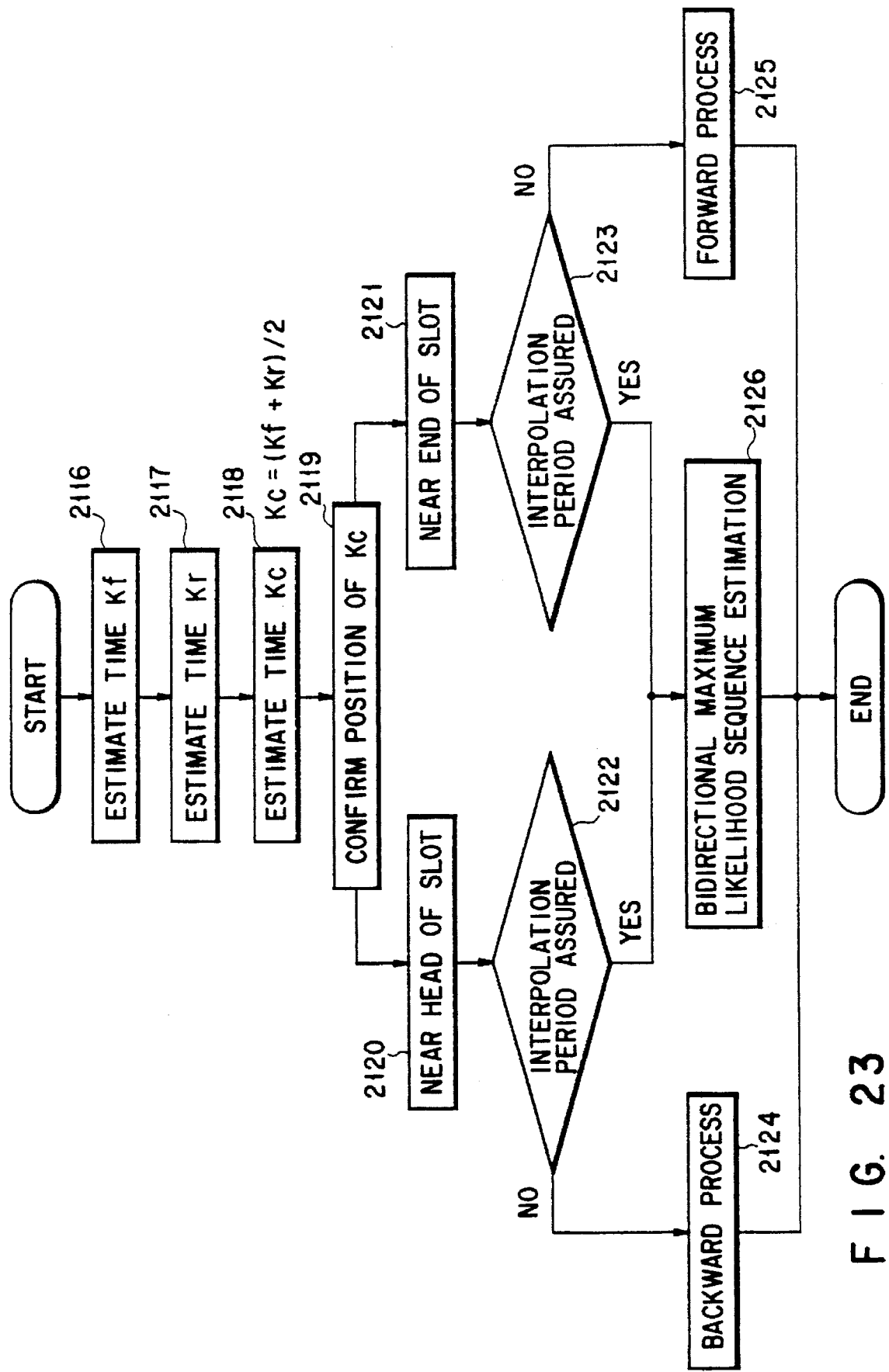
FIG. 23 is a flow chart showing the flow of the process executed when the bidirectional maximum likelihood sequence estimation scheme cannot be executed.

FIG. 23 is a flow chart showing the flow of processes executed when a channel impulse response during the interpolation period cannot be estimated, i.e., when an averaged channel impulse response as a reference for the interpolation process cannot be calculated within the TDMA slot 2103, as described above. As shown in FIG. 23, after the flow starts, time kf, time kr, and time kc are estimated in turn (steps 2116, 2117, and 2118). Thereafter, the position of time kc is confirmed (step 2119). At this time, if it is recognized that time kc is located near the beginning or end of the slot (step 2120 or 2121), it is checked if an interpolation period can be assured (step 2122 or 2123). If YES in step 2122 or 2123, the bidirectional maximum likelihood sequence estimation process is executed (step 2126); otherwise, the backward process (step 2124) or forward process (step 2125) is performed, and the process ends.

Figure 24:
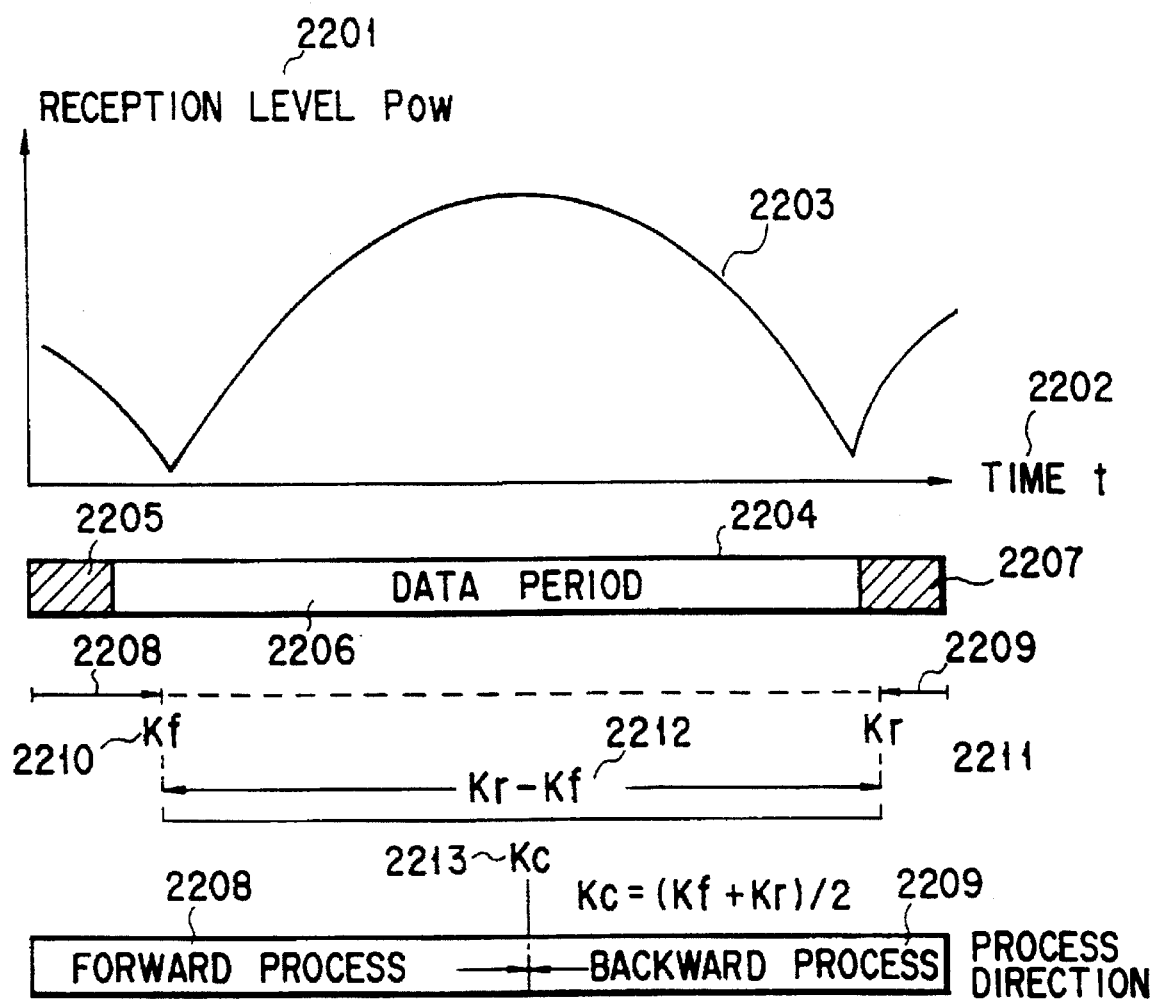
FIG. 24 is a view for explaining the process principle when a plurality of decays of communication quality are detected in a TDMA slot in the bidirectional maximum likelihood sequence estimation scheme.
Figure 25:
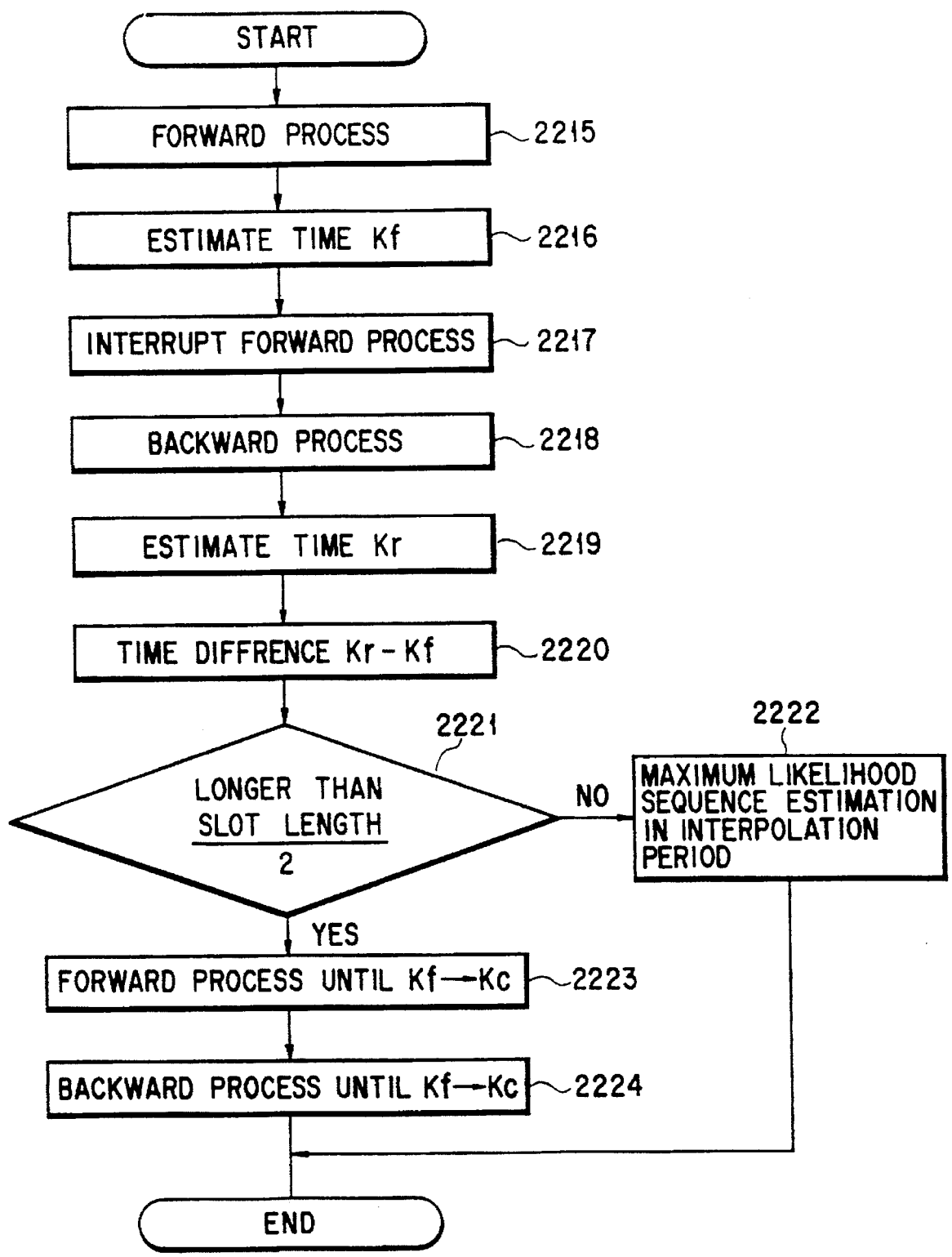
FIG. 25 is a flow chart showing the flow of the process when a plurality of decays of communication quality are detected in a TDMA slot in the bidirectional maximum likelihood sequence estimation scheme.

FIGS. 24 and 25 show the principle of operations of the bidirectional maximum likelihood sequence estimation scheme of the present invention when there are a plurality of decays of communication quality due to a fading variation 2203 unique to a mobile channel in a TDMA slot 2204.

When received level Pow 2201 varies considerably as time t 2202 elapses in the TDMA slot 2204, and decays of communication quality are observed near the beginning and end of the TDMA slot 2204, a forward maximum likelihood sequence estimation process 2208 starting from a training signal sequence 2205 located at the beginning of the TDMA slot 2204 recognizes a decay of communication quality immediately after the start of the process, and is temporarily interrupted at time kf 2210. Also, a backward maximum likelihood sequence estimation process 2209 starting from a training signal sequence 2207 of the neighboring slot following the end of the TDMA slot 2204 similarly recognizes a decay of communication quality immediately after the start of the process, and is temporarily interrupted at time kr 2211.

In the bidirectional maximum likelihood sequence estimation scheme according to the present invention, middle time kc 2213 between time kf 2210 and time kr 2211 is calculated. In this case, when a difference 2212 between time kr 2211 and time kf 2210 is large, the received level Pow 2201 is considered to be sufficient in terms of the characteristics of the channel variation 2203. On the other hand, when the received level Pow 2201 is lowered extremely, the channel variation 2203 often exhibits a very complex phase change. In this situation, even when a channel impulse response from time kf 2210 to time kr 2211 is estimated by interpolation, reliability of the estimated channel impulse response is low and the estimated response cannot contribute to realization of a low bit error rate of the receiver.

For the above-mentioned reasons, when the time difference kr–kf 2212 is equal to or larger than half the length of the TDMA slot 2204, a bidirectional maximum likelihood sequence estimation scheme for performing an interpolation process is not adopted, but a bidirectional maximum likelihood sequence estimation scheme which performs a forward maximum likelihood sequence estimation process 2208 from the start time of the TDMA slot 2204 to time kc, and performs a backward maximum likelihood sequence estimation process 2209 from the end time of the TDMA slot 2204 to time kc is adopted.

FIG. 25 shows the flow of the detailed processes shown in FIG. 24. Referring to FIG. 25, after the flow starts, a forward process (step 2215), estimation of time kf (step 2216), interruption of the forward process (step 2217), a backward process (step 2218), estimation of time kr (step 2219), and a calculation of the time difference kr–kf (step 2220) are performed in turn. It is then checked if the time difference is larger than half the slot length (step 2221). If YES in step 2221, the forward process of kf→kc (step 2223) and the backward process of kr→kc (step 2224) are performed in turn; otherwise, an interpolation maximum likelihood sequence estimation process (step 2222) is performed, and the process ends.

FIG. 26 is graphs showing the bit error characteristics obtained by evaluating the bidirectional maximum likelihood sequence estimation scheme of the present invention in a Rayleigh fading channel as a typical mobile communication channel. In FIG. 26, a bit error rate 2300 is plotted along the ordinate, and a multipath delay 2301 is plotted along the abscissa. FIG. 26 shows the results of computer simulations executed under conditions of a signal-to-noise ratio of 20 (dB), a direct arrival wave power to delay arrival wave power ratio of 0 (dB), a signal bandwidth of 25 (kHz), and a communication frequency of 900 (MHz).

Marks □ ((A) in FIG. 26) along a first characteristic curve 2302 represent the bit error rate characteristics obtained by the maximum likelihood sequence estimation system in only the forward direction, and marks Δ ((B) in FIG. 26) along the curve 2302 represent the bit error rate characteristics obtained by the maximum likelihood sequence estimation system in only the backward direction. As can be understood from this curve, almost the same bit error rates can be obtained in both the forward and backward directions.

A second characteristic curve 2303 in FIG. 26 represents the bit error rate characteristics calculated by the maximum likelihood sequence estimation system according to the present invention. As can be understood from this curve, the bit error rate 2300 can be sufficiently improved by the system of the present invention.

In this embodiment, although not shown in the drawings, upon execution of the bidirectional maximum likelihood sequence estimation scheme which executes the interpolation process according to the present invention, a correct channel impulse response in the interpolation period cannot be calculated unless a channel impulse response hf(kf') obtained as the forward maximum likelihood sequence estimation result and a channel impulse response hr(kr') obtained as the backward maximum likelihood sequence estimation result are synchronized with each other, and an interpolation is performed while causing information contents of the taps of these channel impulse responses hf(kf') and hr(kr') to coincide with each other. For example, in the case of the channel impulse responses of a 2-tap arrangement, a bidirectional maximum likelihood sequence estimation scheme which can realize high performance cannot be constituted unless an interpolation is performed using the first tap of the response hf(kf') and the second tap of the response hr(kr'), and the second tap of the response hf(kf') and the first tap of the response hr(kr') as symmetrical taps.

As has been described in detail above, according to the present invention, burst errors unique to an equalizing system and derived from bit errors generated due to a decrease in received level caused by fading unique to a mobile channel can be avoided, and the bit error rate characteristics of a receiver which are determined by the burst errors can be remarkably improved. In order to enhance the effect of the bidirectional maximum likelihood sequence estimation scheme, in place of processes executed by merely shortening a slot unlike in the prior art, the maximum likelihood sequence estimation direction is optimally controlled in correspondence with time of a decrease in received level due to a fading variation of a channel, and a channel impulse response based on an estimated sequence suffering bit errors is avoided as much as possible, thereby improving the reception characteristics.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A bidirectional maximum likelihood sequence estimation system applied to a TDMA communication which performs transmission/reception in units of slots, comprising:

a forward maximum likelihood sequence estimation processor which operates from a beginning of an assigned slot forward along a time base direction, to estimate an absolute value of a forward channel impulse response from a received signal sequence;

a backward maximum likelihood sequence estimation processor which operates from an end of the assigned slot backward along the time base direction, to estimate an absolute value of a backward channel impulse response from a delayed received signal sequence obtained by delaying the received signal sequence by at least one slot time;

a communication quality estimation processor for receiving the absolute value of the forward channel impulse response and the absolute value of the backward channel impulse response and for estimating forward and backward communication qualities; and a selector for selecting one of estimated sequences of the forward and backward maximum likelihood sequence estimation processors in accordance with an estimation result of the communication quality estimation processor;

each of the forward and backward maximum likelihood sequence estimation processors comprising:

a Viterbi algorithm processor for estimating a transmitted signal sequence from the received signal on the basis of the estimated channel impulse response;

an estimated received signal calculation processor for calculating an estimated received signal at time k on the basis of a training signal sequence or the transmitted signal sequence estimated by said Viterbi algorithm process, and a channel impulse response estimated at time k−1;

an error signal formation processor for forming an error signal between the received signal at time k and the estimated received signal at time k; and a channel impulse response estimation processor for estimating a channel impulse response at time k using an adaptive algorithm on the basis of the error signal, wherein the selector selects the estimation process result with a higher communication quality in units of slots or in units of symbols constituting the slot in accordance with the communication quality estimation processor, and the backward maximum likelihood sequence estimation processor does not perform a backward process when the communication quality does not decay during a forward process, but executes the backward process only when the communication quality decays during the forward process.

2. A system according to claim 1, wherein when the backward process is started upon detection of a decay of communication quality during the forward process, and when a decay of communication quality is not detected during the backward process, the channel impulse response estimation processor determines a maximum likelihood sequence estimated and obtained by the backward process as a final estimated sequence.

3. A system according to claim 1, wherein when the communication quality decays during the forward process, the forward maximum likelihood sequence estimation processor temporarily interrupts the forward process at time kf as a detection time of the decay, and the backward maximum likelihood sequence estimation processor starts the backward process, and when the communication quality also decays during the backward process, the backward maximum likelihood sequence estimation processor temporarily interrupts the backward process at time kr as a detection time of the decay and determines a middle time (kf+kr)/2 between time kf and time kr to be time kc, the forward maximum likelihood sequence estimation processor restarts a forward process from time kf to time kc, the backward maximum likelihood sequence estimation processor restarts a backward process from time kr to time kc, and the communication quality estimation processor determines a forward process result from start time of the TDMA slot to time kc and a backward process result from the end of the slot to time kc+1 to be a finally estimated maximum likelihood sequence.

4. A system according to claim 3, wherein the communication quality estimation processor uses a power value of the estimated channel impulse response obtained by the channel impulse response estimation process as one process executed in a maximum likelihood sequence estimation operation as an estimation reference for determining a decay of communication quality in a maximum likelihood sequence estimation process in the forward direction and a maximum likelihood estimation process in the backward direction.

5. A system according to claim 1, wherein when the communication quality decays during the forward process, the forward maximum likelihood sequence estimation processor temporarily interrupts the forward process at time kf as a detection time of the decay, and the backward maximum likelihood sequence estimation processor starts the backward process, and when the communication quality also decays during the backward process, the backward maximum likelihood sequence estimation processor temporarily interrupts the backward process at time kr as a detection time of the decay, and determines a middle time (kf+kr)/2 between time kf and time kr to be time kc, the forward maximum likelihood sequence estimation processor restarts a forward process from time kf to time kc, the backward maximum likelihood sequence estimation processor restarts a backward process from time kr to time kc, the communication quality estimation processor defines a time interval between time kc−mf−d obtained by subtracting an estimation delay time d due to a channel impulse response estimation algorithm from forward merge time kc−mf in the forward process at time kc, and time kc+mr+d obtained by subtracting the estimation delay time d due to the channel impulse response estimation algorithm from backward merge time kc+mr in the backward process at time kc to be an interpolation period, calculates an estimated channel impulse response during the interpolation period by interpolation on the basis of a forward channel impulse response estimated from a forward merge sequence at time kc−mf obtained in the forward process, and a backward channel impulse response estimated from a backward merge sequence at time kc+mr obtained in the backward process, and one of the forward and backward maximum likelihood sequence estimation processors performs a maximum likelihood sequence estimation process in the interpolation period using the intra-interpolated channel impulse response, such that a maximum likelihood sequence estimation process is performed in the forward direction from a start time of the TDMA slot to interpolation period start time kc−mf−d−1, and a maximum likelihood sequence estimation process is performed in the backward direction from interpolation period end time kc+mr+d+1 to an end time of the TDMA slot.

6. A system according to claim 5, wherein one of two estimated channel impulse responses as references immediately before and after the interpolation period, which are required upon estimation of the channel impulse response in the interpolation period, is an average value of N+1 forward channel impulse responses estimated from the forward merge sequence merged by the forward process from time kc−mf to kc−mf−N with reference to the forward process, the other one is an average value of N+1 backward channel impulse responses estimated from the backward merge sequence merged by the backward process from time kc+mr to time kc+mr+N with reference to the backward process, the interpolation period is defined between time kc−mf−N/2−d and time kc+mr+N/2+d in consideration of the estimation delay time d due to the channel impulse response estimation algorithm, the estimated channel impulse response in the interpolation period is formed by an interpolation process on the basis of the averaged channel impulse response in the forward process and the averaged channel impulse response in the backward process, and a maximum likelihood sequence estimation process is performed in the interpolation period, such that a maximum likelihood sequence estimation process is performed in the forward direction from a start time of the TDMA slot to interpolation period start time kc−mf−N/2−d−1, and a maximum likelihood sequence estimation process is performed in the backward direction from interpolation period end time kc+mr+N/2+d+1 to an end time of the TDMA slot.

7. A system according to claim 1, wherein in order to phase-synchronize two estimated channel impulse responses as references, which are required upon estimation of a channel impulse response in an interpolation period, with reference to a phase of one of the two estimated channel impulse responses, M different estimated channel impulse responses are prepared by phase-rotating the other estimated channel impulse response by phase angles determined by the number M of signal points which depend on a modulator scheme on a phase plane, M different estimated channel impulse responses in the interpolation period are calculated, a maximum likelihood sequence estimation process in the interpolation period is performed using the M different estimated channel impulse responses, and of M different finally survival maximum likelihood sequences, a maximum likelihood estimated sequence having a minimum path metric unique to the M different survival maximum likelihood estimated sequences in the interpolation period is determined to be a most likelihood estimated sequence in the interpolation period.

8. A system according to claim 1, wherein upon calculation of a forward averaged channel impulse response obtained based on estimated channel impulse responses from forward estimated sequence merge time kc−mf to time kc−mf−N in the forward process at time kc, and a backward averaged channel impulse response obtained based on estimated channel impulse responses from backward estimated sequence merge time kc+mf to time kc+mr+N in the backward process at time kc, which responses are required upon estimation of a channel impulse response in an interpolation period, when a sufficient time width N required for calculating the forward averaged channel impulse response cannot be assured since time kc is located near the beginning of the TDMA slot, a most likelihood estimated sequence obtained in the backward process is used as a maximum likelihood estimated sequence of the TDMA slot, and when a sufficient time width N required for calculating the backward averaged channel impulse response cannot be assured since time kc is located near the end of the TDMA slot, a most likelihood estimated sequence obtained in the forward process is used as a most likelihood estimated sequence of the TDMA slot.

9. A system according to claim 1, wherein in determining time kc, when a time difference between time kf at which a communication quality decays in the forward process and time kr at which the communication quality decays in the backward process is not less than half a time period corresponding to a slot length of the TDMA slot, the maximum likelihood sequence estimation process according to a procedure wherein the forward process is temporarily interrupted at time kf as a detection time of the decay, and the backward process is started, and when the communication quality also decays during the backward process, the backward process is temporarily interrupted at time kr as a detection time of the decay, middle time (kf+kr)/2 between time kf and time kr is determined to be time kc, a forward process from time kf to time kc is restarted, a backward process from time kr to time kc is restarted, and a forward process result from start time of the TDMA slot to time kc and a backward process result from the end of the slot to time kc+1 are determined to be a finally estimated maximum likelihood sequence.

* * * * *